US011497960B2

(12) United States Patent
Kapoor

(10) Patent No.: US 11,497,960 B2
(45) Date of Patent: Nov. 15, 2022

(54) MICROLEARNING EVENT MANAGEMENT IN A MODULAR LEARNING SYSTEM

(71) Applicants: Monk Akarshala Design Private Limited, Mumbai (IN); Monk Akarshala Inc., Sacramento, CA (US)

(72) Inventor: Samridh Kapoor, Mumbai (IN)

(73) Assignees: Monk Akarshala Design Private Limited, Mumbai (IN); Monk Akarshala Inc., Sacramento, CA (US)

( * ) Notice: Subject to any disclaimer, the term of this patent is extended or adjusted under 35 U.S.C. 154(b) by 1107 days.

(21) Appl. No.: 16/122,579

(22) Filed: Sep. 5, 2018

(65) Prior Publication Data

US 2018/0374059 A1  Dec. 27, 2018

Related U.S. Application Data

(63) Continuation of application No. 14/344,691, filed as application No. PCT/US2012/054698 on Sep. 12, 2012, now abandoned.

(30) Foreign Application Priority Data

Sep. 13, 2011  (IN) .......................... 2593/MUM/2011

(51) Int. Cl.
| | |
|---|---|
| A63B 24/00 | (2006.01) |
| G06Q 10/10 | (2012.01) |
| G09B 7/00 | (2006.01) |
| G06F 3/04883 | (2022.01) |
| G06F 3/0488 | (2022.01) |
| G06Q 50/20 | (2012.01) |

(52) U.S. Cl.
CPC ........... *A63B 24/00* (2013.01); *G06Q 10/109* (2013.01); *G06Q 10/1097* (2013.01); *G09B 7/00* (2013.01); *A63B 2024/0081* (2013.01); *G06F 3/0488* (2013.01); *G06F 3/04883* (2013.01); *G06Q 50/20* (2013.01)

(58) Field of Classification Search
None
See application file for complete search history.

(56) References Cited

U.S. PATENT DOCUMENTS

| | | | | |
|---|---|---|---|---|
| 2003/0157470 A1* | 8/2003 | Altenhofen | ............... | G09B 7/00 434/350 |
| 2005/0164154 A1* | 7/2005 | Solomon | .................. | G09B 7/00 434/350 |
| 2010/0145801 A1* | 6/2010 | Chekuri | ............. | G06Q 30/0253 705/26.1 |
| 2011/0159472 A1* | 6/2011 | Eck | .......................... | G09B 7/02 434/322 |
| 2011/0212430 A1* | 9/2011 | Smithmier | ............... | G09B 5/06 434/322 |

* cited by examiner

*Primary Examiner* — Jason T Yen
(74) *Attorney, Agent, or Firm* — United One Law Group LLC; Kongsik Kim; Jhongwoo Peck

(57) ABSTRACT

A system and method are disclosed for modularly scheduling learning events in a modular learning system. Information about application services and microlearning events are stored in the modular learning system, with each microlearning event comprising a plurality of learning applications associated with the application services. The modular learning system receives a request from an organizing user to organize a microlearning event, and in response the modular learning system generates a set of services compatible with the event.

16 Claims, 8 Drawing Sheets

| | |
|---|---|
| Certification Metadata 302 | Scoring Metrics Metadata 304 |
| Language Metadata 306 | Performance Type Metadata 308 |
| Duration Metadata 310 | Subject Link/Tag Metadata 312 |
| Age Level Metadata 314 | Learning Facility Metadata 316 |
| Authoring Metadata 318 | Sequence Metadata 320 |
| Tool Metadata 322 | Mode Metadata 324 |
| Media Metadata 326 | Medium Metadata 328 |
| Job Skill Metadata 330 | Error Metadata 332 |
| Template Metadata 334 | Tutor Metadata 336 |

Learning Application 300

*FIG. 3A*

MICROLEARNING EVENT MANAGEMENT IN A MODULAR LEARNING SYSTEM

CROSS REFERENCE TO RELATED APPLICATIONS

This application is a continuation of U.S. Ser. No. 14/344,691, filed 13 Mar. 2014, which is a U.S. National Stage of International Application No. PCT/US2012/054698, titled "Microlearning Event Management in a Modular Learning System" filed on 12 Sep. 2012, which claims the benefit of Indian Provisional Specification No. 2593/MUM/2011, titled "Microlearning Event Management in a Modular Learning System" filed on 13 Sep. 2011, all of which are incorporated by reference in their entireties.

FIELD OF THE ART

The present invention relates generally to modular learning systems, and more particularly to systems and methods of microlearning event management in a modular learning system.

DESCRIPTION OF THE RELATED ART

The current education environment includes members like students or learners, teachers, tutors, coaches, guides, professors or lecturers, content authors, and organization members like preschools, schools, colleges, universities, educational boards and professional standards authorities, admission testing authorities, placement organizations, recruiters, HR departments of organizations, educational content and media publishers and local, regional, and national governments. All the above maintain some form of transactional and functional relationships with each other. Conventionally, organizers of workshops, industrial or educational visits, exchange programs or even short tutorials or courses in the current education environment may organize and manage access to the events manually, or through an event organizing interface of an event organizing system and base the same on the curriculum, syllabus, course material or educational media constraints determined by an educational board, standards authority, preschool, school, college, university, department of education of a local, regional or national government to which the organizer is affiliated or whose curriculum, syllabus or course material it follows. Further, some organizing institutions like certain preschools, schools, colleges or universities in the current education environment may grant event access only to students who are admitted to each such institution, with access restricted to other educational events of other organizing institutions to any student of a particular institution. Recently, modular learning systems enable a plurality of kinds of users to establish transactional and functional relationships with each other, and such users include a plurality of learning users, tutoring users, learning application authoring users, a plurality of kinds of learning facility administering users, learning tool supplying users, a plurality of kinds of learning event organizing users like microlearning workshop organizing users and microlearning visit organizing users, in addition to a plurality of learning applications.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3A is a block diagram of the metadata of a learning application according to one embodiment.

SUMMARY OF THE INVENTION

Figure 1:
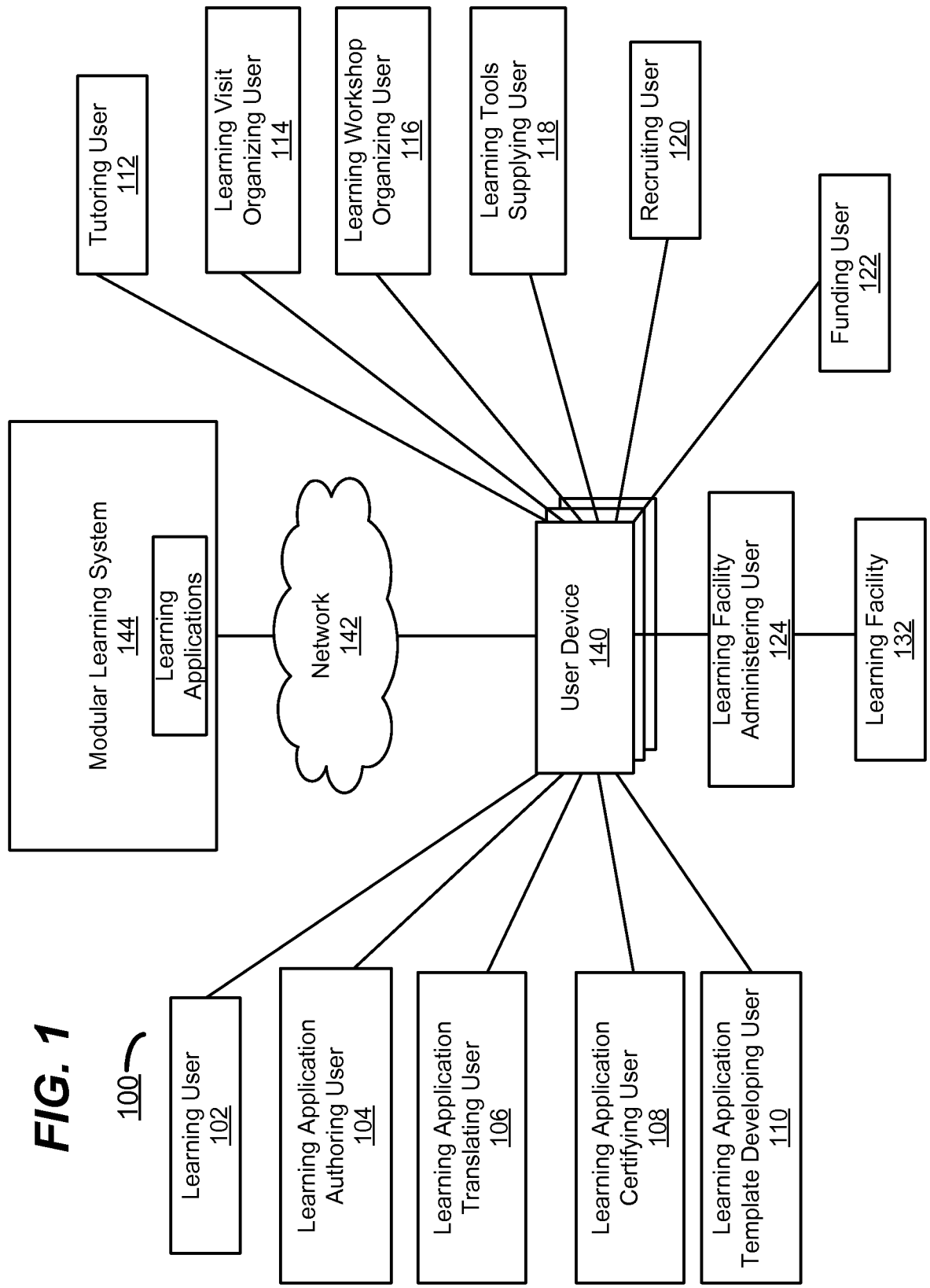
FIG. 1 is a modular learning environment including a modular learning system according to one embodiment.

The present invention specifically relates to management of microlearning events in a modular learning system. The invention describes a system and a method of scheduling and organizing learning events in the modular learning system.

When the modular learning system receives an event initiation request from the event organizing user, the system validates the organizing users credentials before granting access to the event organizing interface. This is followed by the determination of the sequence of learning applications or services, and compatibility of selected application services. The system receives minimum purchase and performance requirements of the learning users and the microlearning event. If all the applications and services are available, and if the payment terms are acceptable, then the microlearning event is published to the learning user marketplace.

The method for managing the published microlearning event in a modular learning environment is also provided

DETAILED DESCRIPTION

The Figures (FIGS.) and the following description relate to embodiments by way of illustration only. It should be noted that from the following discussion, alternative embodiments of the systems, methods, figures, diagrams and interfaces disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the systems, methods, figures, diagrams and interfaces illustrated herein may be employed without departing from the principles described herein. In the following description, for the purposes of explanation, numerous specific details are set forth in order to provide a thorough understanding of the various embodiments. It will be evident, however to one skilled in the art that the various embodiments may be practiced without these specific details.

Configuration Overview

A system and method for managing the purchase and performance of a learning application and associated application services stack is provided. Further, a method of modularly scheduling learning events has been described in detail. The invention further relates to microlearning event management in a modular learning system 144. A modular learning system 144 stores and manages a plurality of learning applications. For example, a learning application may relate to swimming, learning a level of mathematics, or learning a form of martial art. The learning application may relate to fact-based lessons, such as a history lesson, to a performance-based skill, such as swimming, or to a creative skill such as writing and directing a play. The learning applications comprise learning content and metadata for determining compatibility of the learning application with users and learning services required for performing the learning application. Prior to purchasing and using a learning application, a learning user is verified as compatible for receiving and using the learning application. Learning applications are described in further detail below.

Learning users purchasing a learning application may select learning service providers compatible with the particular learning application in order to learn the content of the learning application. Such learning services may include access to a learning facility, learning tools, learning aids, learning materials, tutoring services, testing services and other services. Each of these learning services may be selected by the learning user 102 and may be provided by a different entity. Each learning application comprises a plurality of kinds of application metadata in addition to the instructional content and associated media for a particular topic or subject. The instructional content and media of each learning application may comprise a specific unit of instruction for a particular portion of knowledge or a skill, and may vary widely in scope. The learning user 102's relationship with the various application service providers is managed through modular learning system 144 with respect to individual learning applications. Each of the learning services is also associated with metadata which may describe aspects of the application services, application service availability, learning user's compatibility with the application services, schedules, and other aspects of the application services. This metadata relating to the learning services is described in further detail below.

For example, a learning user 102 using the modular learning system 144 may obtain, in micro increments of time and money, tutoring services from a particular tutoring user 112, learning applications from a content application authoring user 104, learning tools, aids or materials from a learning tools supplying user 118, learning visits from a learning visits organizing user 114, learning facility access to a learning facility 132, learning workshop access from a learning workshop organizing user 116 and may wish to seek placement or recruitment at another organization through a user registered on the system as a recruiting user 120. The modular learning system 144 enables each of these entities to provide services to the learning user 102 using the learning applications. As such, the modular learning system 144 enables the learning user 102 to identify learning content applications the learning user 102 is interested in, and connecting the learning user 102 with application service providers that can provide distinct application services associated with those learning content applications.

Figure (FIG.) 1 is a modular learning environment 100 including a modular learning system 144 according to one embodiment. Modular learning system 144 operates in modular learning environment 100 and communicates with a plurality of user devices 140 over a network 142. The user devices 140 are operated by a plurality of kinds of users in the learning environment. The user devices 140 may comprise any of a variety of computing devices, such as a desktop computer, a laptop, a mobile device, a tablet computer, a set-top box, a kiosk, interactive television, gaming console, and other computing platforms suitable for communicating with modular learning system 144. The modular learning system 144 provides a system for managing curricula, learning facilities, standardized tests, learning applications, tutors, and other modules of a learning experience in micro increments of time and money. The modular learning system 144 enables the various users to communicate with other users in a learning environment and provide services to learning user 102. The network 142 includes a wireless area network, a local area network, a General Packet Radio Service (GPRS) network, an Enhanced Data for Global Evolution (EDGE) network and the like. The user devices 140 are connected to the modular learning system 144 via the network 142.

Modular learning system 144 allows a learning user 102 to manage the purchase and performance of each module of a single microlearning service stack for a learning application (e.g. Breaststroke) or a group of learning applications (e.g. Breaststroke, Freestyle, Butterfly and Swimming Safety). Tutor access, such as access to a swimming instructor may be purchased in various increments, such as in hours. Learning content applications such as a breaststroke application with attached instructional media and other data may be purchased in timed access quantities or may be permanently purchased. Learning facility access such as an Olympic Sized Swimming Pool may be purchased in increments of hours or learning application performances such as ten laps. Learning tools or materials such as Swimming Goggles may be purchased as well. Each of these modules may be separately purchased and interacted with through an interface displayed on user device 140. In case of a learning performance which can be completed on the user device 140 itself, the learning application content is not only purchased and managed, but also performed, through an interface displayed on the user device 140. A learning user 102 may manage the purchase and performance of groups of microlearning performances in the form of learning visits and learning workshops, through an interface displayed on user device 140. Learning user 102 may manage an individual learning identity (or learning profile) and offer details of microlearning application performances completed by him, as well as the personal learning metrics, scores, and reviews. This learning identity may be provided to recruiting users for the purpose of placement.

The modular learning system 144 manages, regulates and supervises the purchase, sale, preview, performance and review of a plurality of microlearning applications, each comprised modularly of a tutoring service, a learning application, learning facility access, and/or learning tools or infrastructure access, a learning visit, and/or a workshop as described in further detail below. The modular learning system 144 manages transactional and functional relationships between users of the modular learning system 144. These various users interact with the modular learning system 144 to modify learning applications and provide learning services as described below.

The modular learning system 144 may enable various other users including but not limited to tutors, authors, tool/material suppliers learning application template developers, translators, certifying user, learning facility administrators, learning event organizers, recruiters, and funders to modularly manage at least one of micro tutoring services associated with specific learning applications, microlearning content applications, microlearning application templates, translation of microlearning content applications, certification of microlearning content applications, access to learning facilities, access to learning workshops, organization of learning visits associated with specific learning applications, supply of tools, aids and/or materials, recruitment services, as well as granular funding services.

The modular learning system 144 enables a tutoring user 112 to provide micro tutoring services to learning user 102. Tutoring user 112 are typically individuals with credentials or other knowledge in the area of learning applications. The tutoring user 112 may associate themselves with particular pieces of content and may indicate qualifications to teach each learning application, as is described further below. The modular learning system 144 manages the sale of micro tutoring services and associated tutoring user 112 with specific learning applications to learning user 102. Tutoring user 112 assists the learning user 102 with learning the subject matter of the learning application. As such, the modular learning system 144 facilitates the meeting and communication of tutors and learners. Tutoring user 112 may also provide learning performance data to the modular learning system 144. The learning performance data may indicate, for example, the level of the learner's mastery or proficiency through scoring or other metrics for reviewing performance at a learning performance task. The tutoring user 112 provides input to the modular learning system 144 using a plurality of learning applications through an interface displayed on the tutoring user's 112 user device 140.

The modular learning system 144 enables a learning application authoring user 104 to manage the drafting, editing, testing, publishing, sale and updates of learning content in applications through an interface displayed on user device 140. That is, the learning application authoring user 104 authors individual pieces of learning content which may be purchased and used by a learning user. For example, a learning application authoring user 104 may create instructional content for learning the backstroke. The instructional content may comprise instructions and multimedia, as well as directions for the learning user 102 to practice aspects of the backstroke in a suitable pool. The learning application authoring user 104 may use a pre-existing application template to create the learning application.

The modular learning system 144 enables a learning application template developing user 110 to create learning templates for use in creating learning applications. The learning application templates provide a framework for creating various types of learning applications. For example, learning application templates may comprise a quiz, simulation, role play, experiment, multimedia material, and other types of learning frameworks. The learning application template developing user 110 may manage the development, testing and sale of the learning application templates to learning application authoring users 104 through an interface displayed on a user device 140.

The modular learning system 144 enables a learning application translating user 106 to manage the translation and translation updates of learning content in applications and sale of such services to microlearning content application authors through an interface displayed on a user device 140. The translations are provided to the modular learning system 144 and may be stored with the corresponding learning application to enable providing instructions to learning users 102 in a variety of languages.

The modular learning system 144 enables a learning application certifying user 108 to certify various learning applications according to standards applied by the certifying user 108. Such certifying users may include boards of education at various levels, universities, professional standards groups, and other certification authorities. Certifying users 108 may or may not be formal institutions. For example, a certifying user may include a company establishing a set of learning applications to prepare a candidate for a job with the company. The certifying user 108 manages the certification of each learning content application as a part of their respective curricula or syllabi and manages the sale of such certification services to learning content application authoring users, through an interface displayed on user device 140.

The learning facility 132 facilitates the performance of specific learning applications available on the modular learning system 144. Learning facility 132 may comprise any location suitable for performing types of learning applications. For example, learning facility 132 may comprise an athletic club, a chemistry lab, a science lab, a university, a library, or a tutor's home. In some embodiments, the modular learning system 144 enables a facility administering user 124 to determine the compatibility of various learning applications which can be performed within learning facility 132 by picking the learning infrastructure available in the learning facility and associating the learning facility 132 with each learning application (e.g. Breaststroke) compatible with the learning infrastructure (e.g. Olympic sized Swimming Pool). In one embodiment, rather than expressly associating the learning facility with individual learning applications, the learning facility administering user 124 indicates to the modular learning system 144 the specific infrastructures and amenities available at the learning facility 132. In this embodiment, the modular learning system 144 enables a learning user 102 or learning application authoring user 104 to identify a learning facility 132 which is compatible with the learning application based on the infrastructure available at the learning facility 132. The modular learning system 144 may also identify compatible learning facilities based on metadata associated with the learning application and the infrastructure indicated by the learning facility administering user 124.

The learning facility 132 may comprise a variety of types of learning facilities, such as an independent learning facility, institutional learning facility, workplace learning facility, and temporary learning facility. The modular learning system 144 enables an administrator 124 of an independent learning facility owned, managed or franchised by the modular learning system 144 to manage the sale of learning facility access for performances of specific microlearning applications as well as sale of learning tools and materials (e.g. sulphuric acid or swimming goggles) or access to the same in micro increments of time and money ($6/hour or $5/learning application performance) depending on multiple factors like the learning infrastructure to be accessed (e.g. Swimming Pool, Computers, Chemistry Lab), number of hours of access, and the like, through an interface displayed on a user device 140.

The modular learning system 144 enables an administrator 124 of an institutional learning facility like a preschool, school, college or university (e.g. Bangalore University) associated, partnered or linked with the modular learning system 144 to, in addition to managing the sale associated with the independent learning facility (e.g. learning facility access for performances of specific microlearning applications), manage the learning performances of a plurality of learners (students or outsiders) across a plurality of learning applications available on the system (with the learning user's explicit consent), optionally delegated to a plurality of teachers, professors, lecturers or coaches registered as tutoring users 112 on the modular learning system 144, through an interface displayed on a user device 140.

The modular learning system 144 enables an administrator 124 of a workspace learning facility associated, partnered or linked with the modular learning system 144 to, in addition to managing the sale associated with the independent learning facility (e.g. learning facility access for performances of specific microlearning applications), manage the learning performances of a plurality of learners (employees) across a plurality of learning applications available on the system (with the learning user's explicit consent), optionally delegated to a plurality of Human Resource Managers, Trainers and/or immediate superiors, registered as tutoring users 112 on the modular learning system, through an interface displayed on a user device 140.

The modular learning system 144 enables an administrator 124 of a temporary learning facility (e.g. a Cricket Ground available for net practice on Saturdays and Sundays from six in the morning to twelve in the midnight) to, in addition to managing the sale associated with the independent learning facility (e.g. learning facility access for performances of specific microlearning applications), manage the hours of accessibility to the designated learning facility, through an interface displayed on a user device 140. In addition to managing the sale and performance of microlearning applications, an administrator of an independent, institutional, workspace, or temporary learning facility may manage the modular purchase of learning infrastructure (e.g. chemistry equipment, computers, cricket stumps) as well as learning tools, aids and materials (e.g. sulphuric acid, swimming goggles, cricket bat) from the modular learning system or a third party, topic wise, subject wise, location wise or otherwise based on the learning applications intended to be offered in the designated learning facility, through an interface displayed on a user device 140.

The modular learning system 144 enables a learning visit organizing user 114 to manage the organization of learning visits, and the sale of learning visits to learning users 102. The learning visit organizing user 114 may also associate a learning visit with compatible microlearning applications. Such learning visits may comprise, for example, a visit to a factory or industrial area, a museum, or a trip to a city. The learning visit organizing user 114 may associate the learning visit with learning applications and manage the learning performances if necessary during the learning visits. The management of performances of associated learning applications may be optionally provided by tutoring users 112. The learning visit organizing user 114 communicates with the modular learning system 144 through an interface displayed on a user device 140.

The modular learning system 144 enables a learning workshop organizing user 116 to manage the organization of workshops available to learning users 102. A workshop comprises a plurality of specific microlearning applications to be performed in the workshop, and a sequence of the microlearning applications to be performed at the workshop. The workshop may also specify learning tools, a designated learning facility, and a tutoring user or tutoring users to perform the workshop. As such, the workshop user organizes performance and modules of learning applications to be performed together with a group of learning users 102. The learning workshop organizing users 116 also manage the sale of such microlearning workshop access and manage the learning performances for a plurality of learners. The learning workshop organizing users communicate with the modular learning system 144 through an interface displayed on a user device 140.

The modular learning system 144 enables a learning tools supplying user 118 to provide learning tools and materials such as chemicals, biology samples, computer software, and other materials for use in conjunction with learning applications to learning users 102. The learning tools supplying user 118 manages the organization and sale of the learning tools and materials (or optionally, access to the same) to learning users and administrators of learning facility 132. The learning tools supplying user 118 may also associate learning tools with particular learning applications stored on modular learning system 144. Alternatively, the learning tools supplying user 118 may designate the tools available and the modular learning system 144 may determine which learning applications may require the tools provided by the learning tools supplying user 118. Responsive to the determination the learning tools supplying user communicates with the modular learning system 144 through an interface displayed on a user device 140.

The modular learning system 144 enables a recruiter 120 of learning users 102 to manage the recruitment of learning users 102 through the modular learning system 144. The recruiter 120 may view and filter learning users 102 by specific learning applications performed on the system, scores, metrics and reviews generated in relation to the learning applications performed by learning users 102. The recruiter may access and filter learning users 102 based on demographic data like the language used in performing the learning application. Recruiting user 120 may also operate as a certifying user 108 to certify particular learning applications that may be desirable to the recruiting user 120. The recruiting user may use the certified application as a filter prior to considering learning users for a position. The recruiting user 120 manages recruiting access to the modular learning system 144 through an interface displayed on a user device 140.

The modular learning system 144 enables a funding user 122 of learning users 102 to provide funding and scholarship funds and other support to learning users 102. Such funding users 122 may comprise a parent, sibling, friend, spouse, relative, university, employer, or scholarship/grant offering institution. The funds may be provided for the funding of specific learning users or of specific learning applications, or of specific microlearning goods and services associated with the specific learning applications, in small increments, through an interface displayed on a user device 140.

Although the modular learning environment 100 is described as being composed of various, user devices (e.g. personal computer), a network (e.g. internet, intranet, world wide web), learning facilities (e.g. an Independent Learning Facility, an Institutional Learning Facility), it would be appreciated by one skilled in the art that fewer or more kinds of users (e.g. a Learning Application Fact Checking User, a Web Based Offsite Tutoring User), user devices (e.g. a mobile phone device, a portable gaming console device, a tablet device, a learning console device, gaming console device or server device attached to a television or other screen), networks (e.g. an intranet at a preschool, school, college, university, educational board, professional standards authority, coaching/tuition class; a social or professional network; an intranet at a company, HR department, training department and at a training organization) and learning facilities may comprise the modular learning environment 100, with the present disclosure still falling within the scope of various embodiments.

Figure 2:
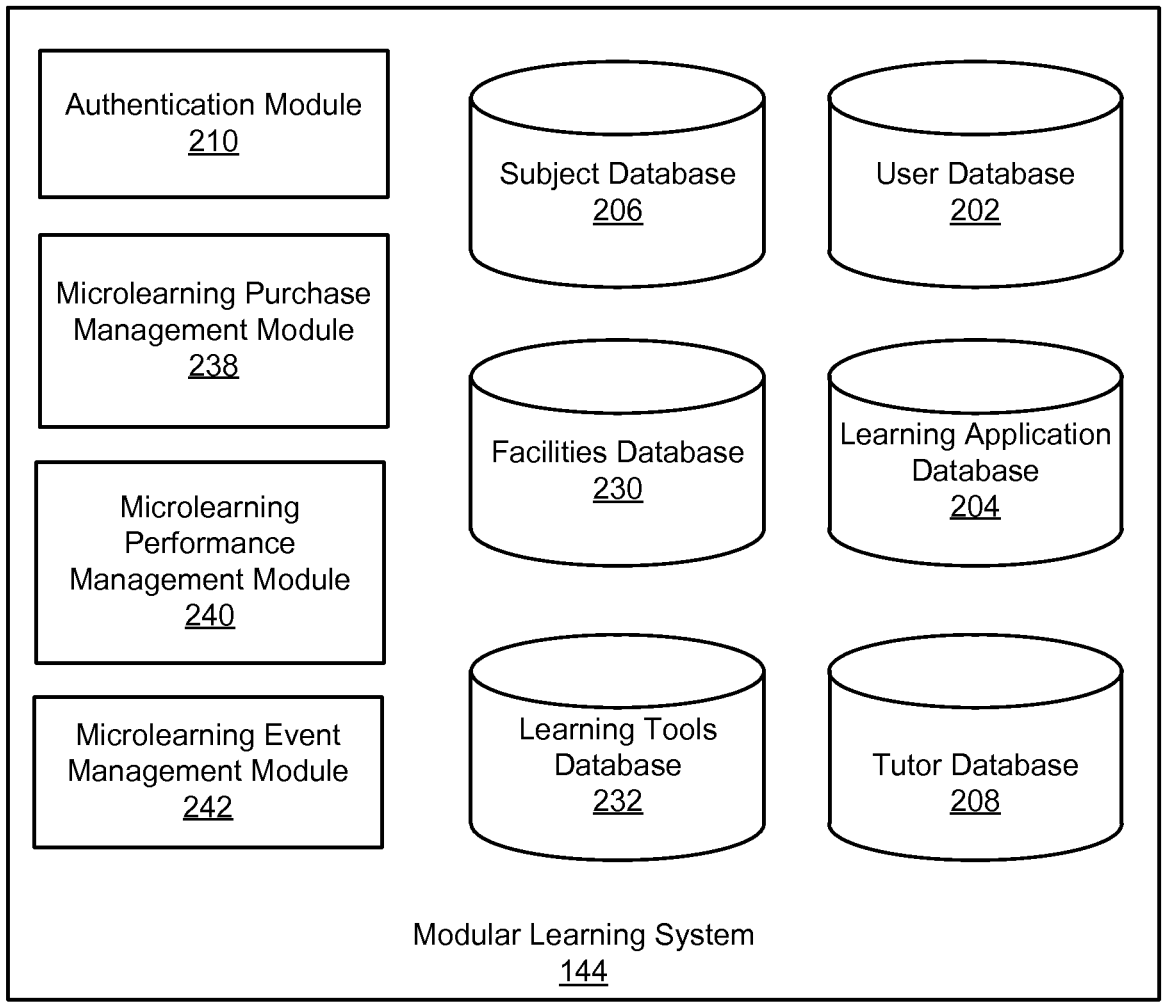
FIG. 2 is a block diagram of a modular learning system according to one embodiment.

FIG. 2 is a block diagram of a modular learning system 144 according to one embodiment. The modular learning system 144 includes maintaining a variety of databases and modules for providing learning applications and learning services to users of the modular learning system 144. The modular learning system 144 maintains learning applications in a learning application database 204, each learning application associated with metadata defining performance metrics and each learning application comprising a plurality of application service. The learning applications are sold to users along with microlearning services using the purchase management module 238. Performance of learning applications is enabled by performance management module 240. Additional modules of the modular learning system 144 are described below.

The learning user database 202 is configured for receiving, storing, retrieving and updating a plurality of data fields of each subset of learning users scheduled to attend the microlearning event from the larger plurality of learning users in database 202 of the modular learning system 144. Each learning user associated with privacy settings authorizing one or more users to view the performance measurements associated with each learning user A user database 202 is further configured for receiving, storing, updating and retrieving a plurality of data fields of each user, such as the user's name, address, and contact details. Depending on the user's role in the modular learning system 144, the user database 202 maintains additional information on the user. For example, for a learning user 102, the user database 202 maintains learning history outside the modular learning system 144, learning application performance history on the modular learning system 144, purchase history of learning applications as well as purchase history of a host of related microlearning purchase items like, for example, timed access to a learning facility 132, timed access to a tutor 112 or his services, and purchase of access to a learning tool from learning tools database 232. In some embodiments, the data fields are used to determine purchase compatibility using purchase management module 238 and to determine performance compatibility using performance management module 240.

The user database 202 may maintain information about each type of user based on the user's role in the system. The user information may be stored in a plurality of databases, each database associated with a user role, or the user roles may be stored in a single user database 202. For example, the additional user roles include learning application authoring users, learning facility administering users, learning visit organizing users, and other types of users of the modular learning system 144.

In one embodiment, a distinct Learning User Database is configured for receiving, storing, updating and retrieving a plurality of data fields of each learning user 102, comprising the learning user's name, address, contact details as well as learning related data fields like learning history outside the modular learning system 144, learning application performance history on the modular learning system 144, purchase history of learning applications as well as purchase history of a host of related microlearning purchase items like, for example, access to learning facility 132, access to tutor 112, and purchase of access to a learning tool. In one embodiment, a distinct Learning Application Authoring User Database is configured for receiving, storing, updating and retrieving a plurality of data fields of each learning application authoring user 104. In one embodiment, a distinct Independent Learning Facility Administering User Database is configured for receiving, storing, updating and retrieving a plurality of data fields of each independent learning facility administering user 124. In one embodiment, a distinct Learning Tools Supplying User Database is configured for receiving, storing, updating and retrieving a plurality of data fields of each learning tools supplying user 118. In one embodiment, a distinct Learning Visit Organizing User Database is configured for receiving, storing, updating and retrieving a plurality of data fields of each learning visit organizing user 114. In one embodiment, a distinct Learning Application Translating User Database is configured for receiving, storing, updating and retrieving a plurality of data fields of each learning application translating user 106. In one embodiment, a distinct Learning Application Certifying User Database is configured for receiving, storing, updating and retrieving a plurality of data fields of each learning application certifying user 108. In one embodiment, a distinct Learning Application Template Developing User Database is configured for receiving, storing, updating and retrieving a plurality of data fields of each learning application template developing user 110. In one embodiment, a distinct Learning Workshop Organizing User Database is configured for receiving, storing, updating and retrieving a plurality of data fields of each learning workshop organizing user 116. In one embodiment, a distinct Recruiting User Database is configured for receiving, storing, updating and retrieving a plurality of data fields of each recruiting user, say, recruiting user 120. In one embodiment, a distinct Funding User Database is configured for receiving, storing, updating and retrieving a plurality of data fields of each funding user, say, funding user 122.

In one embodiment, a distinct Institutional Learning Facility Administering User Database is configured for receiving, storing, updating and retrieving a plurality of data fields of each, institutional learning facility administering user 124. In one embodiment, a distinct Workspace Learning Facility Administering User Database is configured for receiving, storing, updating and retrieving a plurality of data fields of each workspace learning facility administering user 124. In one embodiment, a distinct Temporary Learning Facility Administering User Database is configured for receiving, storing, updating and retrieving a plurality of data fields of each temporary learning facility administering user 124. In one embodiment, a distinct Learning Facility Database is configured for receiving, storing, updating and retrieving a plurality of data fields of a plurality of kinds of learning facilities, say, facility 132, as received from a plurality of kinds of learning facility administering users 124. In one embodiment, a distinct Learning Visits Database is configured for receiving, storing, updating and retrieving a plurality of data fields of each learning visit from the respective learning visit organizing user, say user 114. In some embodiments, the data fields of the databases in the above embodiments are used to determine purchase compatibility using purchase management module 238 and to determine performance compatibility using performance management module 240.

The learning application database 204 is configured for receiving, storing, updating and retrieving all the learning application metadata of all learning applications whose performance is managed through the microlearning performance management module 240. Optionally, all purchase related metadata of the learning application, like number of copies accessed per day per location, language, learning facility, user device, or other learning related purchase analytics metadata that may be generated during the purchase process may be received, stored, and updated by the microlearning purchase management module 238 in the learning application database 204.

In one embodiment, the learning application database 204 is configured for receiving, storing, updating and retrieving all the learning application metadata of all learning applications whose performance is managed through the microlearning performance management module 240. Optionally, all performance related metadata of the learning application, like number of copies performed per day per location, language, learning facility, user device, or other learning related performance analytics metadata that may be generated during the performance process may be received, stored, and updated by the microlearning performance management module 240 in the learning application database 204.

The learning application database 204 may be further used to receive, store, retrieve and update a plurality of learning application and associated identifier and metadata items published and updated by learning application authoring user 104 on the modular learning system 144. A subset of the metadata may be accessed by a microlearning event management interface generator 434 to be displayed with the corresponding microlearning event application preferences interface through an interface displayed on user 116's device 140.

A subject database 206 is configured for receiving, storing, updating and retrieving a plurality of data fields of each subject linked or tagged to each learning application 300 in Subject Metadata 312. The subject database 206 provides a categorization system for the learning applications and enables learning application authoring users, like user 104, to categorize learning applications as belonging to one or more subjects by associating them with one or more subjects, such subjects are then stored in subject metadata 312 of each authored learning application 300. The subject database 206 also allows users to search for learning applications according to particular subjects using the subjects associated with the learning applications. For example, a tutoring user 112 with a mathematics specialty may search the learning applications using the subject database 206 to identify mathematics learning applications for the tutor to associate his services with.

A tutor database 208 is configured for receiving, storing, updating and retrieving a plurality of data fields of each tutoring user, comprising the tutoring user's name, address, contact details, as well as learning related data fields like learning users to whom microlearning services have or are being provided, performance data and performance review data for the tutoring services, tutoring history outside the modular learning system 144, and remittance history. In some embodiments, the data fields are used to determine purchase compatibility using purchase management module 238 and to determine performance compatibility using performance management module 240.

An authentication module 210 is configured for validating the login credentials of the learning user 102 and also validate and confirm the microlearning event purchase item of the learning user 102. The authentication module 210 is further configured for comparing the login credentials filled in by the learning user through the microlearning event access interface generated by interface generator 434 with the credentials preferences of the learning user by accessing the same from learning user database 202.

A learning facility database 230 is configured for receiving, storing, updating and retrieving a plurality of data fields of a plurality of kinds of learning facilities such as learning facility 132 as received from learning facility administering users 124. In some embodiments, the data fields are used to determine purchase compatibility using purchase management module 238 and to determine performance compatibility using performance management module 240.

A learning tools database 232 is configured for receiving, storing, updating and retrieving a plurality of data fields of each learning tool or material from each learning tools supplying user 118. In some embodiments, the data fields are used to determine purchase compatibility using purchase management module 238 and to determine performance compatibility using performance management module 240.

Each of these databases, such as the tutor database 208, facilities database 230, and learning tools database 232, may also include information relating to purchase and performance compatibility. For example, a tutor in the tutor database may specify the tutor is only willing to teach students aged thirty to forty, or a learning facility may indicate it is only willing to allow entry to learning users who are a member of the facility.

A purchase management module 238 is configured for managing the purchase of learning applications and associated application services as a microlearning stack by the learning user 102.

A performance management module 240 is configured for managing the performance of learning applications and associated application services as a microlearning stack by the learning user 102.

A microlearning event management module 242 is configured for managing a microlearning event in a modular learning system. In one embodiment, the microlearning event management module 242 receives an event initiation request from an organizing user and, in response, retrieves a microlearning event schedule and determines the availability of services associated with the event schedule, wherein the event schedule designates a sequence of learning applications associated with the microlearning event. If the necessary services for the event are available, the event management module 242 manages learning user access to the event, processes the learning user's performances, and displays updated purchase and performance analytics to the organizing user 114 or 116.

In one embodiment, the tutor database, learning facilities database, tools database and other application services databases form a single consolidated application services database in modular learning system 144.

Although the modular learning system 144 is described as being composed of various components like databases and modules, the modular learning system 144 may comprise fewer or more databases, components, and other modules. For example, the modular learning system 144 may include a Learning Application Genre Database, a Locational Learning Facility Price Range Database, a Learning Workshop Database, a Multilingual Dictionary Database, a Concept Tags Database, a Learning Objectives/Outcomes Database, a Micro tutoring Services Database, and a Skill and Ability Tags Database. The modular learning system 144 may also include an Age Compatibility Module, a Learner Ranking Module, a Tutor Ranking Module, a Learner Billing Module, a Tutor Remittance Module, a Profile Management Module, a User Roles Management Module, a Learning Tools Management Module, a Learning Facility Management Module, Metadata Management Module, a Notification Module, a Recruitment Module, a Funding Module, a Map Module, a Learning Application Template Programming Interface Module, an Age Compatibility Module or a Translation Interface Module, with the present disclosure still falling within the scope of various embodiments. In some embodiments, an individual or group may play a plurality of user roles on the modular learning system, (e.g. tutoring user learning new applications as a learning user through another tutoring user, a learning application authoring user translating the authored application or developing the application template), with the present disclosure still falling within the scope of various embodiments.

In various embodiments the modular learning system 144 may be any of a web application, a mobile application, or an embedded module or subsystem of a social networking environment, a learning content management system, a learning management system, a professional networking environment, an electronic commerce system, an electronic payments system, a mobile operating system, a computer based operating system, or of a tablet based operating system, with the present disclosure still falling within the scope of various embodiments.

In one embodiment, a distinct roles management module is configured for managing and authorizing different roles associated with the various users of the modular learning system 144 and in the respective user databases. For example, the roles management module may provide distinct feature tabs and functionalities to each user based on the role associated with him or her. It can be noted that, the roles management module may enable a user to have one or more roles for accessing the modular learning system 144. For example, a tutoring user can avail the functionality and interface tabs of a learning user and also of a translating user if authorized by the modular learning system 144.

In one embodiment, a distinct metadata management module is configured for managing metadata associated with a plurality of specific learning applications, like learning application 300. In one embodiment, the metadata management module is configured for receiving, storing, updating and retrieving various types of metadata associated with each learning application 300 in the learning application database 204. In another embodiment, the metadata management module is configured for receiving and storing updated metadata of a specific learning application 300 in database 204 at regular intervals of time as updated by different users in authorized user roles and retrieving the required metadata when requested by the purchase management module 238 and the performance management module 240 for determining compatibility and performance compatibility of requested microlearning service stack respectively. In yet another embodiment, the metadata management module enables various users of the modular learning platform to update metadata associated with specific learning applications in the learning application database according to their user role.

It is appreciated that, in some embodiments, various databases like 202, 204, 206, 208, 210, 230, and 232, modules 238, 240 and 242 as well as the databases, engines, modules and components of the above embodiments may be stored in the form of machine readable instructions in the memory of the modular learning system 144 and executed by a processor of the modular learning system 144 to perform one or more embodiments disclosed herein. Alternatively, the various databases like 202, 204, 206, 208, 210, 230, and 232, modules 238, 240 and 242 as well as the databases, engines, modules and components of the above embodiments may be implemented in the modular learning system in the form of an apparatus configured to perform one or more embodiments disclosed herein.

FIG. 3 is a block diagram of a learning application 300, according to one embodiment. Each learning application 300 comprises a plurality of kinds of application metadata in addition to the instructional content and associated media for a particular topic or subject. The instructional content and media of each learning application 300 may comprise a specific unit of instruction for a particular portion of knowledge or a skill, and may vary widely in scope. The learning application 300 may be very narrow in scope, such as "treading water" or may be broad in scope, such as "overview of world history", depending on the authoring process of learning application authoring user 104. The learning application 300 could indicate a theoria (to think, a theory based application using primarily memory, reasoning, logic) performance type or a praxis performance type (to do, a practical performance type or a poeisis performance type). The learning application 300 may comprise metadata indicating associated application services for purchasing or performing the learning application 300 like tutor metadata 336, tools metadata 322 and learning facility metadata 316.

In one embodiment, the learning application 300 may be requested for purchase or performance with associated application services as a microlearning service stack, wherein the application services comprise of access to tutoring user 112, access to a learning tool from learning tools database 232 and access to a learning facility from facilities database 230. For example, the media metadata 326 of a learning application 300 provided by learning application authoring user 104 may specify instructions for learning how to swim a breaststroke, but the media metadata 326 does not typically specify individual pools i.e. learning facilities to perform the learning application or tutors to coach and review the performance. Rather, the application services metadata like tutor metadata 336, tools metadata 322 and learning facility metadata 316 indicates tutors, tools, and facilities which the learning user may choose to perform the learning application's instructions.

The Certification Metadata 302 is used to receive, store, retrieve, display and update certification history as well as live certifications of the learning application 300, including, for example, a certification from educational board 108 and another educational board in another state, present as a certifying user in database 202 or a distinct certifying user database. In some embodiments, the certification metadata is also used to determine purchase compatibility in the microlearning purchase management module 238 through learning application database 204 and to determine performance compatibility in the microlearning performance management module 240 through learning application database 204.

The Scoring Metrics Metadata 304 is used to receive, store, retrieve, display and update a plurality of metrics for quantitative and qualitative scoring as defined and updated for learning application 300 by learning application authoring user 104. In some embodiments, the quantitative scoring of each metric is conducted during the performance by a dedicated module within the learning application 300 itself, while in other embodiments of a performance, especially a non-screen based praxis or poeisis performance, the quantitative and optionally, qualitative score for each metric is received through a user device 140 from the learning user 102 and/or the tutoring user 112. In some embodiments, the scoring metrics metadata is also used to determine purchase compatibility in the microlearning purchase management module 238 through learning application database 204 and to determine performance compatibility in the microlearning performance management module 240 through learning application database 204.

The Language Metadata 306 is used to receive, store, retrieve, display and update a plurality of translations of all user viewable application metadata for learning application 300 translated by, for example, learning application translating user 106 into Bengali, comprising of media metadata 326 like instructional text, subtitles to audio and video instructions, and all other linguistic content for the preview, performance and review of learning application 300 by learning user 102 and preview and review of the learning performance by tutoring user 112. In some embodiments, metadata 306 further comprises translations in at least one other language, of performance type metadata 308, duration metadata 310, subject links and tags metadata 312, age level metadata 314, learning facility metadata 316 authoring metadata 318, sequence metadata 320, tool metadata 322, mode metadata 324, medium metadata 328 and job skill metadata 330. In some embodiments, the language metadata is also used to determine purchase compatibility in the microlearning purchase management module 238 through learning application database 204 and to determine performance compatibility in the microlearning performance management module 240 through learning application database 204.

The Performance Type Metadata 308 is used to receive, store, retrieve, display and update the performance type of the learning application 300. For example, the metadata 308 could indicate a theoria (to think, a theory based application using primarily memory, reasoning, logic, like a 'Biomechanics of Swimming' Pop Quiz) performance type or a praxis performance type (to do, a practical performance type like an 'eight hundred meter Freestyle Swim as per Olympic performance guidelines' or a poeisis performance type (to make, a creation oriented performance type like a 'five minute Synchronized Swimming Choreography'), such that the learning user is already aware of the task or performance type before purchasing and performing the learning application 300. In some embodiments, the performance type metadata is also used to determine purchase compatibility in the microlearning purchase management module 238 through learning application database 204 and to determine performance compatibility in the microlearning performance management module 240 through learning application database 204.

The Duration Metadata 310 is used to receive, store, retrieve, display and update the suggested duration of the learning application 300. In some embodiments, the metadata 310 indicates a fixed duration like, fifteen minutes, or thirty minutes, or one hour, while in other embodiments, the metadata indicates a variable duration with, optionally, a predetermined minimum or maximum duration depending on the duration metadata set by the learning application authoring user 104. In some embodiments, the duration metadata is also used to determine purchase compatibility in the microlearning purchase management module 238 through learning application database 204 and to determine performance compatibility in the microlearning performance management module 240 through learning application database 204.

The Subject Metadata 312 is used to receive, store, retrieve, display and update a plurality of subject links and tags attached to the learning application 300 by the learning application authoring user from among the subject links and tags present in the Subject Database 206. In some embodiments, the subject links and tags are attached to specific concepts or terms within the Media Metadata 326. In some embodiments, the subject link/tag metadata is also used to determine purchase compatibility in the microlearning purchase management module 238 through learning application database 204 and to determine performance compatibility in the microlearning performance management module 240 through learning application database 204.

The Age Level Metadata 314 is used to receive, store, retrieve, display and update the suggested age level of the learning user 102 for performance of the learning application 300. In some embodiments, the age level is set as a minimum suggested age say, for example, ten plus by the learning application authoring user 104. In other embodiments, a range of suggested learner ages is set by the learning application authoring user 104. In some embodiments, the age level metadata is also used to determine purchase compatibility in the microlearning purchase management module 238 through learning application database 204 and to determine performance compatibility in the microlearning performance management module 240 through learning application database 204.

The Learning Facility Metadata 316 is used to receive, store, retrieve, display and update the suggested learning infrastructure required in a learning facility for performance of the learning application 300. In some embodiments, such learning facilities and infrastructure (e.g. Olympic Sized Swimming Pool) required for the performance of the learning application (e.g. eight hundred meter Freestyle to Olympic Guidelines) is received and updated by the learning application authoring user 104 by picking the same from a learning facility database 230 available on the modular learning system 144. In other embodiments the metadata 316 is received and updated by the administering user 124 of learning facility 132. In some embodiments, the learning facility metadata is also used to determine purchase compatibility in the microlearning purchase management module 238 through learning application database 204 and to determine performance compatibility in the microlearning performance management module 240 through learning application database 204.

The Authoring Metadata 318 is used to receive, store, retrieve, display and update the authoring metadata received by the learning application author 104, including for example the name, signature, contact details, intellectual property disclaimer and other information of the user or user group. In some embodiments, the metadata also includes metadata generated by the modular learning system 144 during the authoring user's editing process, including the version history, tracked changes and time stamps of edits and updates to the learning content application. In some embodiments, the metadata may also include citations to other learning content applications or other learning content application authoring users made by the user 104.

The Sequence Metadata 320 is used to receive, store, retrieve, display and update the suggested sequence of performance of the learning application 300 relative to another learning application. The sequence metadata may indicate if the learning application should be performed before, after, instead of, or with another learning application by learning application authoring user 104. The user 104 may wish for any learning user, say 102 to perform an advanced microbiology learning application 300 only after performing a corresponding beginner's microbiology learning application, irrespective of the learning user's age or quality of performance. In other embodiments, wherein the learning application authoring user is not the author of the suggested beginner's application, the user 104 may input a sequence suggesting to the learning user 102 to perform the learning application before or after a learning application authored by another learning application authoring user. In some embodiments, the sequence metadata is also used to determine purchase compatibility in the microlearning purchase management module 238 through learning application database 204 and to determine performance compatibility in the microlearning performance management module 240 through learning application database 204.

The Tool Metadata 322 is used to receive, store, retrieve, display and update the compatible tools or learning materials to the learning application 300. In some embodiments, the tool compatibility is received from and updated by the learning application authoring user 104 by accessing the tools database 232. In other embodiments, the tool compatibility is received and updated by the learning tools supplying user 118 by accessing the learning application database 204. In still other embodiments, the tool compatibility may be updated by the modular learning system 144. In some embodiments, the tool metadata is used to determine purchase compatibility of the microlearning purchase management module 238 through learning application database 204 and to determine performance compatibility in the microlearning performance management module 240 through learning application database 204. In some embodiments, wherein the learning tool is a peripheral input device which can be connected to the user device 140 during the learning application performance (e.g. Electric Guitar attached to a user device 140 during an 'Introduction to Hard Rock' learning application) the Tool Metadata includes the compatibility to the user device 140. In other embodiments, wherein the learning material is not material to the user device 140, (e.g. Sulphuric Acid during a Chemistry Experiment) the Tool Metadata may not include any additional user device compatibility.

The Mode Metadata 324 is used to receive, store, retrieve, display and update the available modes of performance of the learning application. In some embodiments, the mode metadata 324 is determined by the modes chosen by the learning application authoring user from the learning application template chosen. In various embodiments, the learning application may comprise an individual learner performance mode, a learner plus learner cooperative performance mode, a learner versus learner competitive performance mode, a learner plus tutor cooperative performance mode, a learner versus tutor competitive performance mode, a limited plurality of learners (e.g. four learners) cooperative performance mode, a limited plurality of learners (e.g. four learners) competitive performance mode, a tutor plus limited plurality of learners (e.g. nine learners) cooperative performance mode (a typical classroom mode). Although the Mode Metadata 324 is described as being composed of various available modes as chosen by the learning application authoring user, various other modes (e.g. a limited plurality of learners vs a limited plurality of learners competitive performance mode) may comprise the Mode Metadata 324 and still fall within the scope of various embodiments. In some embodiments, the various Media Metadata 326 for the preview, performance and review screens for each mode of the same learning application and the sequence of the same (especially wherein the learning application 300 is performed by multiple users from the same user device and, optionally, by viewing the same display device) is received, stored, retrieved, displayed and updated in the Media Metadata 326. In some embodiments, the mode metadata 324 is also used to determine purchase compatibility in the microlearning purchase management module 238 through learning application database 204 and to determine performance compatibility in the microlearning performance management module 240 through learning application database 204.

The Media Metadata 326 is used to receive, store, retrieve, display and update text, image, audio, video, animation, links and other interactive elements of the learning content application as received and updated by the learning application authoring user 104 during the publishing and revision of the learning application 300. In other embodiments, the learning application Media Metadata may comprise the theoria, praxis or poeisis task or, optionally, plurality of tasks to be completed during the performance, their sequence, and, optionally, the learning outcomes and objectives of the same. In some embodiments, the media metadata is also used to determine purchase compatibility in the microlearning purchase management module 238 through learning application database 204 and to determine performance compatibility in the microlearning performance management module 240 through learning application database 204.

The Medium Metadata 328 is used to receive, store, retrieve, display and update the medium of access to the learning application preview, review and performance screen during the microlearning performance. For example, for a Beginner's Kathak Dancing microlearning Application, in addition to requiring a compatible learning facility and tutoring user, the learning application authoring user 104 or, optionally, modular learning system 144 may require the preview and review screen to be viewable only on a display device connected to a learning console user device or the display device of a computer device but not a mobile device screen to ensure an optimum learning experience. In another case, for a Kathak Quiz microlearning application, the learning application authoring user 104 or, optionally, modular learning system 144 may require the performance screen, preview screen and review screen to be viewable only on a mobile device screen but not on a display device connected to a learning console user device, or the display device of a computer device. In some embodiments, the medium metadata may further comprise the compatibility to a plurality of software platforms and, optionally, runtime environments as determined by the modular learning system 144. In some embodiments, the medium metadata is also used to determine purchase compatibility in the microlearning purchase management module 238 through learning application database 204 and to determine performance compatibility in the microlearning performance management module 240 through learning application database 204.

The Job Skill Metadata 330 is used to receive, store, retrieve, display and update the skills and abilities tagged to the learning application 300 by the learning application authoring user 104, the recruiting user 120 or, optionally, the modular learning system 144 from a skills and abilities database provided by the modular learning system 144. In some embodiments, the metadata is used by a recruiting user 120 to post the completion of the learning application (optionally, in a controlled testing environment) or group of applications as a minimum requirement for a particular job role to a plurality of potentially employable learning users. In other embodiments, the metadata is used by the recruiting user 120 to post the requirement of completion of the learning application 300 (optionally, in a controlled testing environment) or group of applications as a minimum requirement for a promotion to a higher post in a particular organization, to a plurality of potentially employable learning users. In some embodiments, the job skill metadata is also used to determine purchase compatibility in the microlearning purchase management module 238 through learning application database 204 and to determine performance compatibility in the microlearning performance management module 240 through learning application database 204.

The Error Metadata 332 is used to receive, store, retrieve, display and update the potential errors which can be made by the learning user 102 (e.g. ten potential errors in an auditing microlearning application), as determined by the learning application authoring user 104. In some embodiments, wherein the learning application (e.g. a Karnataka History Quiz) is performed through an input device on a user device 140 itself, the error metadata may be synchronized to each potential input point during the learning application 300 performed through the user device 140 by the learning application authoring user 104. In some embodiments, wherein the learning application (e.g. a Karate kata) 300's error metadata is outside the recordable boundaries of the user device 140, the potential errors may be entered with reference to each instructional step of the performance by the learning application authoring user 104, such that at the time of the performance, the tutoring user (or, in some modes, the learning user 102 himself, another learning user, or the recruiting user 120) may note errors in each observable step of the performance and confirm the same on user device 140 to generate the score. In other embodiments, wherein the error observed by the observing user (say, tutoring user 112) is not part of the potential errors in the Error Metadata 332 of the application 300, the tutoring user 112 may update such errors to the Errors Metadata, or optionally, send the same to the learning application authoring user 104, to be updated after review. In some embodiments, the error metadata is also used to determine purchase compatibility in the microlearning purchase management module 238 through learning application database 204 and to determine performance compatibility in the microlearning performance management module 240 through learning application database 204.

The Template Metadata 334 is used to receive, store, retrieve, display and update the default script, formatting and media modules of the learning application template used to author the learning application 300. In some embodiments, wherein a particular sequence and format of the same has been chosen by the learning application authoring user from the options offered in the template developed by the learning application template developing user, the chosen setting may be a part of the Template Metadata 334. In various embodiments, the learning application templates may comprise a quiz, role play, simulation, project, experiment, essay, recital, research paper, race, challenge, problem, game, question, exercise or problem set. In some embodiments, the templates may be for performances conducted and supervised in front of a display device with an input device connected to the user device 140, while in other embodiments the templates may be for previews, reviews and guidelines for performances conducted without the input device, with the user device 140 merely placed next to the performance area or learning station (e.g. for Praxis Tasks in Dance Applications) as a reference point. Although the Template Metadata is described as being composed of various available templates as developed by the learning application template authoring user and chosen by the learning application authoring user, various other templates (e.g. a Swimming Race Template, a Patent Drafting Template) may comprise the Template Metadata 334 and still fall within the scope of various embodiments. In some embodiments, the template metadata is also used to determine purchase compatibility in the microlearning purchase management module 238 through learning application database 204 and to determine performance compatibility in the microlearning performance management module 240 through learning application database 204.

The Tutor Metadata 336 is used to receive, store, retrieve, display and update the compatibility of tutoring users to learning content application. In some embodiments, the tutoring user compatibility is received from and updated by the tutoring user 112 by updating the tutor database 208 (e.g. a Mathematics Tutoring User whose medium of instruction is Mandarin, updating compatibility to a plurality of Mathematics microlearning applications available in Mandarin, in the tutor database 208). In other embodiments, the tutoring user compatibility metadata is received from and updated by the tutoring user 112 by accessing the learning application database 204. In still other embodiments, the tutoring user compatibility metadata may be updated by the modular learning system 144. In some embodiments, the Tutor Metadata 336 is also used to determine purchase compatibility in the microlearning purchase management module 238 through learning application database 204 and to determine performance compatibility in the microlearning performance management module 240 through learning application database 204.

In various embodiments, the metadata of a learning application 300 is retrieved, displayed to and updated by a plurality of kinds of users as may be applicable to the kind of metadata and the kind of user. Optionally, in addition to receiving and storing the metadata, the modular learning system 144 may update the learning application metadata as and when generated in the system through a dynamic metadata update module or through a dedicated administering user. In some embodiments, the learning application authoring user 104 may further play the role of the learning application template developing user. In some embodiments, the modular learning system 144 may play the role of the learning application authoring user 104 and, optionally, the role of the learning application template developing user 110 to author and update the media and template metadata of the learning application 300.

In some embodiments, the microlearning purchase management module 238 and microlearning performance management module 240 retrieve some or all of the above metadata associated with the learning application 300 from a learning application database 204 in a repository module of the modular learning system 144.

In some embodiments, the media metadata 326 of the learning application may comprise an electronic textbook, an electronic journal, an instructional video, or an instructional animation. In some embodiments each learning application 300, may be a distinct mobile application, browser based web application, or a desktop application. In some embodiments, each learning application 300 may be an executable file, a program, add in, macro, plug-in, or other program of instructions associated with a plurality of application programming interfaces of the modular learning system 144.

Although the learning application 300 is described as comprising various metadata and associated data fields stored and updated in learning application database 204, fewer or more metadata and associated data fields (e.g. Application Programming Interface Metadata, Organization versus Organization Social Learning Mode Metadata, University versus University Social Learning Mode Metadata, Testing Metadata, Learning Visits Metadata, Learning Workshops Metadata, Tutorials Metadata) may comprise the Learning Application 300 and associated learning application database 204, with the present disclosure still falling within the scope of various embodiments. In some embodiments, each version of the same learning application 300 with different metadata, for example language metadata, is treated as a distinct learning application in learning application database 204.

In some embodiments, an authorization to update certification metadata 302 of a learning application 300 is limited to a predetermined plurality of certifying users like user 108 and recruiting users like user 120. In some embodiments, an authorization to update scoring metrics metadata 304, performance type metadata 308, age level metadata 314, authoring metadata 318, mode metadata 324, media metadata 326, medium metadata 328, and error metadata 332 of a learning application 300 is limited to a predetermined plurality of learning application authoring users like user 104. In some embodiments, an authorization to update language metadata 306 of a learning application 300 is limited to a predetermined plurality of learning application translating users 106. In some embodiments, an authorization to update duration metadata 310 of a learning application 300 is limited to a predetermined plurality of learning application authoring users like user 104 and learning application template developing users like user 110. In some embodiments, an authorization to update subject link/tag metadata 312 of a learning application 300 is limited to a predetermined plurality of users in any user role. In various embodiments, such authorizations may be set by an administrator of system 144 based on the user role, user profile information and user preferences information of the corresponding users.

In some embodiments, an authorization to update learning facility metadata 316 of a learning application 300 with associated learning facilities is limited to a predetermined plurality of learning facility administering users 124. In some embodiments, an authorization to update sequence metadata 320 of a learning application 300 is limited to a predetermined plurality of learning application authoring users 104 and tutoring users 112. In some embodiments, an authorization to update tool metadata 322 of a learning application 300 with associated learning tools is limited to a predetermined plurality of tools supplying users 118. In some embodiments, an authorization to update job skill metadata 330 of a learning application 300 is limited to a predetermined plurality of recruiting users like user 120. In some embodiments, an authorization to update template metadata 334 of a learning application 300 is limited to a predetermined plurality of learning application authoring users 104 and a predetermined plurality of template developing users 110. In some embodiments, an authorization to update tutor metadata 336 of a learning application 300 with associated tutoring services is limited to a predetermined plurality of tutoring users 112. In some embodiments, an authorization to update an optional learning event metadata of a learning application 300 with associated learning workshops, visits and other learning events is limited to a predetermined plurality of learning workshop organizing users 116 and learning visit organizing users 114. In some embodiments, the associations of application services to learning applications are enabled automatically by a metadata association module in the system 144. In some embodiments, each learning application 300 is associated with a subset of learning facilities in a learning facilities database 230. In some embodiments, each learning application 300 is further associated with a subset of learning stations of each associated learning facility. In some embodiments, each learning application is associated with a subset of tutors in a tutor database 208. In some embodiments, each learning application is associated with a subset of tools in a learning tools database 232.

Figure 3B:
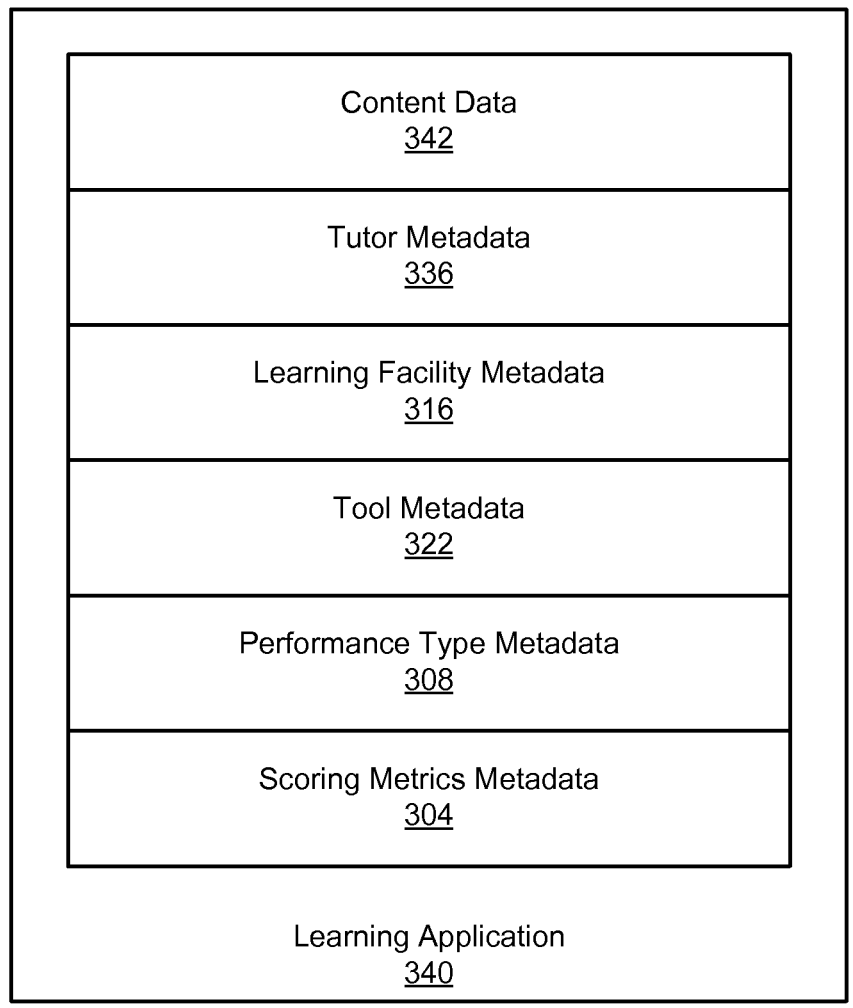
FIG. 3B is a block diagram of the metadata of a learning application according to an alternative embodiment.

FIG. 3B is a block diagram of a learning application 340 according to another example embodiment. The learning application 340 is illustrated to depict metadata of the learning application related to a microlearning service stack. The learning application 340 also illustrates some other performance data used during its performance by a learner. This microlearning service stack may be requested for purchase or performance by learning user 102. In this embodiment, the microlearning service stack includes a learning application 340, a time based tutoring service by a particular tutor in database 208, time based access to a particular learning facility from database 230, and access to a particular tool from database 232. The particular services above may or may not be associated with the corresponding tutor metadata, facilities metadata, and tool metadata of learning application 340 at the time of a request. The learning application 340 includes content data 342 which designates particular content media and content attributes of the learning application 340. The learning application also includes other metadata as described above, such as tutor metadata 336, learning facility metadata 316, learning tool metadata 322, performance type metadata 308, and scoring metrics metadata 304. As such, the learning application 340 illustrates some aspects of the learning application used for purchase or performance of the learning application 340 by a learner as part of a microlearning service stack, such as content, tutors, facilities, and tools. The learning application 340 may also include any other metadata as described above with reference to FIG. 3A. Any other metadata as described above with reference to FIG. 3A may also be part of the content data 342 of the learning application 340.

The lifecycle of a learning application 300 is now described according to one embodiment. Initially, a learning application template developing user 110 creates a learning application template stored in a distinct template database in a modular learning system 144. Next, the learning application authoring user 104 publishes learning application content stored as media metadata of the learning application 300. In case a template has been chosen for the application 300, the template metadata 334 is stored as well. The tutor metadata 336, learning facility metadata 316, learning tool metadata 322 and other optional application services metadata indicating tutoring services, learning facilities, learning tools, and other application service types associated with the learning application 300 are dynamically updated by the corresponding tutoring users, learning facility administrators, tool suppliers and other application service providers. At this point, the learning user may modularly select application services in a microlearning stack to purchase or perform the learning application. Next, the learning user 102 selects the learning application 300 and identifies application services requested for purchase or performance as a consolidated stack. The approval of the purchase or performance request for learning application 300 and particular application services in the microlearning service stack may be determined by the specific metadata of the learning application 300 being associated with corresponding application services, and other specific metadata of the learning application being compatible with the profile information and preferences of the learning user.

Figure 4:
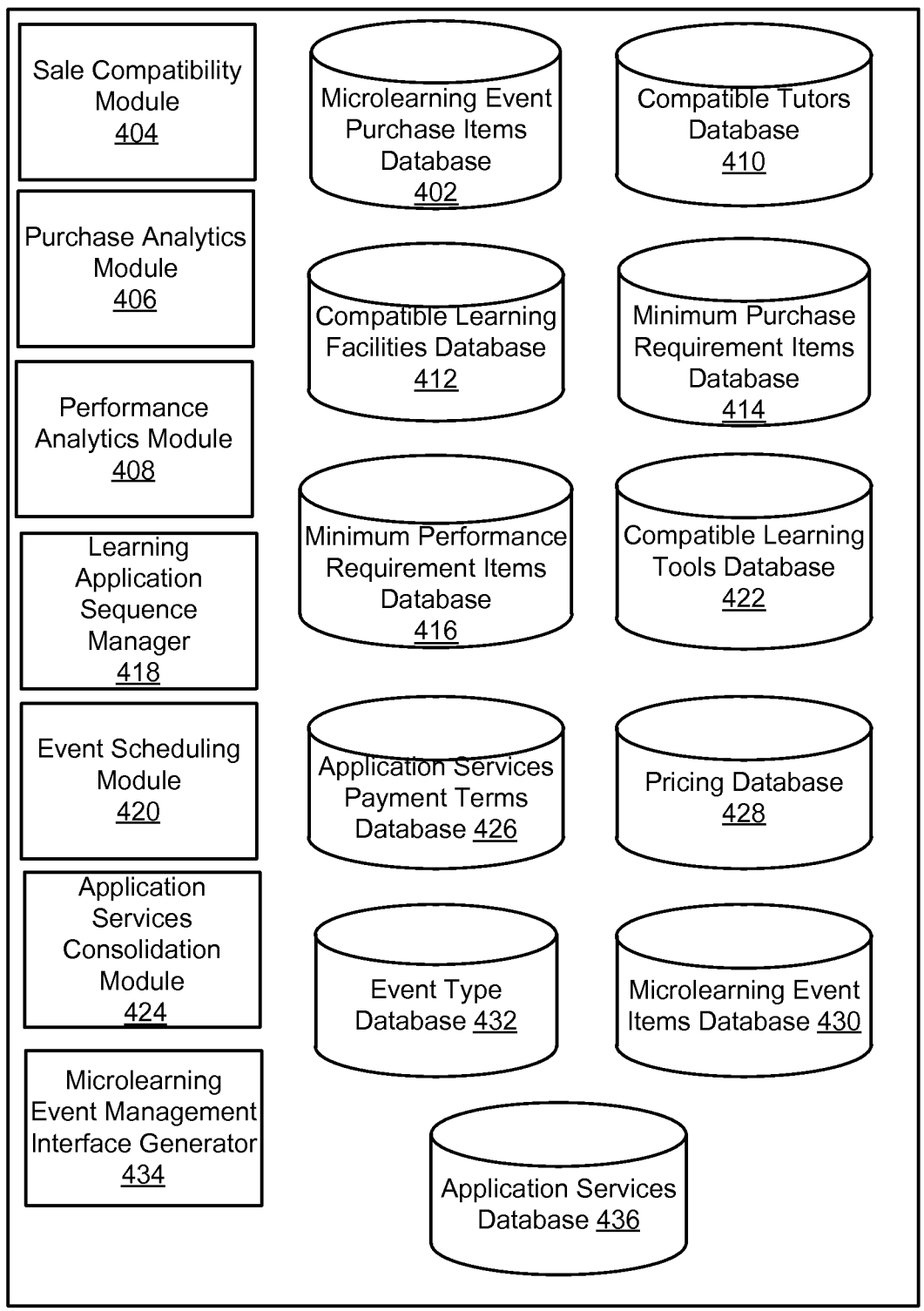
FIG. 4 is a block diagram of the microlearning event management module according to one embodiment.

FIG. 4 is a block diagram of the microlearning event management module 242 according to one embodiment. The microlearning event purchase items database 402 is configured for receiving, storing, retrieving and updating unique purchase items for each distinct microlearning event scheduled to be organized by the organizing user 116 by retrieving the microlearning event items of each event and the price items of each microlearning event, wherein the purchase items serve as an indicator of number of purchases. The step of receiving purchase items is performed to determine the actual number of purchases. The microlearning event purchase items may be accessed by the microlearning purchase management module 238 during the promotion or sale of access to each corresponding microlearning event to a plurality of learning users on the modular learning system 144.

The sale compatibility module 404 is configured for determining the compatibility of a microlearning event purchasing learning user, say user 102, and each microlearning event item, before the purchase transaction of the microlearning event is completed. The sale compatibility module 404 retrieves microlearning event items from microlearning event items database 430 and learning application identifier items and metadata items from learning application database 204 and stores the same for access by the microlearning purchase management module 238 to deny the purchase of the microlearning event by the learning user 102 when some or all of the learning application metadata of the applications to be performed are incompatible with the corresponding identity items and, optionally, preferences of the learning user 102. For example, the sale compatibility module 404 may determine the incompatibility of a biology microlearning event wherein all applications are previewed, performed and reviewed in French, with a learning user 102, whose instruction medium preference is English, by accessing language metadata 306 of each such learning application 300 as well as the corresponding learning user identity items from the database 202.

The purchase analytics module 406 is configured for generating a plurality of purchase analytics data items for each microlearning event whose access is purchased to be performed, by accessing purchase data items of the microlearning event from the microlearning purchase management module 238. Further, the module 406 is used to generate a plurality of purchase analytics data interface items for the corresponding data items of each microlearning event. The microlearning event management interface generator 434 accesses the interface items and displays the same to each corresponding microlearning event organizing user through an interface on the microlearning event organizing user's device 140.

The performance analytics module 408 is configured for generating a plurality of performance analytics data items for each learning application performed in the microlearning event by accessing performance data items of the learning applications from the microlearning performance management module 240. Further, the performance analytics module 408 is used to generate a plurality of performance analytics data interface items for the corresponding data items of each learning application. The microlearning event management interface generator 434 accesses the interface items and displays the same to each corresponding microlearning event organizing user 114 or 116 through an interface on the microlearning event organizing user's user device 140. In some embodiments, the performance data items of the learning application may exclude the identity items of the learning users who have performed the learning application, based on the performance privacy preferences of the learning users in the user database 202.

The compatible tutors database 410 is configured for receiving, storing, retrieving and updating a plurality of data fields of a subset of tutoring users compatible with the preferred learning applications for the microlearning event chosen by organizing user 116 by accessing the same from the data items of the larger plurality of tutoring users in tutor database 208 of the modular learning system 144. In some embodiments, the compatible tutors database 410 is accessed by the application services consolidation module 424 and the interface generator 434 while receiving tutoring service preferences for each learning application from the organizing user 116.

The compatible learning facilities database 412 is configured for receiving, storing, retrieving and updating a plurality of data fields of a subset of learning facilities compatible with the preferred learning applications for the microlearning event chosen by organizing user 116 by accessing the same from the data items of the larger plurality of learning facilities in facilities database 230 of the modular learning system 144. In some embodiments, the compatible learning facilities database 412 is accessed by the application services consolidation module 424 and the interface generator 434 while receiving learning facility preferences for each learning application from the organizing user 116.

The minimum purchase requirement items database 414 is configured for receiving, storing, retrieving and updating a plurality of minimum number of purchases to be chosen by the organizing user 116 to determine the minimum requirements for the purchase of access to the microlearning event without which the purchase amount is refunded to the learning users who have purchased access to the microlearning event (e.g. minimum number of learning users required to attend the microlearning event for the event to be, or service availability of all preferred application services before the performance of the microlearning event).

The minimum performance requirement items database 416 is configured for receiving, storing, retrieving and updating a plurality of minimum performance requirement item choices to be chosen by the organizing user 116 to determine the minimum requirements for the initiation of the microlearning event or specific applications within the microlearning event. For example, organizing user 116 may prefer that the microlearning event only be initiated once all learning users scheduled to attend the microlearning event have validated their credentials and thus confirmed their presence at the microlearning event. Alternatively, the organizing user 116 may prefer that a learning application with a plurality of learning modes and nine attending users may not be performed until six learning users are present and have validated their credentials for the learning application performance.

The learning application sequence manager 418 is configured for determining the learning applications sequence by accessing the sequence metadata 320 of each learning application 300 of the plurality of preferred learning applications chosen by organizing user 116. In other embodiments, the learning applications sequence may be manually determined by the organizing user based on the difficulty level of each application of the plurality of learning applications.

The event scheduling module 420 determines the schedule for each application performance in the microlearning event from the event schedule input by organizing user 116 to the event scheduling interface displayed as part of the microlearning event management interface generated by microlearning event management interface generator 434 and displayed to the user 116 on the user 116's user device 140. The compatible learning tools database 422 is configured for receiving, storing, retrieving and updating a plurality of data fields of a subset of learning tools compatible with the learning applications that are part of the microlearning event chosen by organizing user 116 by accessing the same from the identifier items of the larger plurality of learning tools in database 232 of the modular learning system 144. In some embodiments, the module is accessed by the application services consolidation module 424 and the microlearning event management interface generator 434 while receiving learning tools preferences for each learning application from the organizing user 116.

The application services consolidation module 424 is configured for accessing the compatible tutors database 410, compatible learning facilities database 412, and compatible learning tools database 422 to determine application services compatible with each of the learning applications chosen by user 116. In some embodiments, the consolidation module 424 receives application service preferences for each learning application to be performed in the microlearning event from organizing user 116 through the microlearning event management interface and corresponding application services preference items and input areas generated by generator 434 and displayed on the user 116's user device 140. In some embodiments, an event schedule may designate a sequence of learning applications associated with the microlearning event. Further, the application services consolidation module 424 may consolidate the microlearning event schedule with the service availability of each of the application services required to be available at the scheduled date, time and location for each learning application performance by accessing the service availability items of the preferred and a set of compatible application services from compatible tutors database 410, learning facility database 412 and compatible learning tools database 422 as well as schedule preferences for each learning application in a specified microlearning event from event scheduling module 420.

The application services payment terms database 426 is configured for receiving, storing, retrieving and updating a plurality of payment terms items for each preferred application service of each preferred learning application required to be performed at the microlearning event. The payment terms items may be accessed for the preferred application service providers from the microlearning purchase management module 238 or, optionally, received from the microlearning application service providers on modular learning system 144.

The pricing database 428 is configured for receiving, storing, retrieving and updating the preferred price of one or a plurality of microlearning events scheduled to be organized by organizing user 116. The pricing database 428 may be accessed by the microlearning purchase management module 238 during the purchase of access to microlearning events by learning users on the modular learning system 144.

The microlearning event items database 430 is configured for receiving, storing, retrieving and updating a plurality of microlearning event identifier items like event type preferences. The microlearning event identifier items are selected by organizing user 116 from among a plurality of event type item choices displayed by event management interface generator 434. In some embodiments, the event items database 430 receives microlearning event identifier items like learning application preferences and sequence preferences from organizing user 116, through application services consolidation module 424 and learning application sequence manager 418. In some embodiments, the event items database 430 receives microlearning event identifier items like minimum purchase and performance requirement preferences from minimum purchase requirement items database 414 and minimum performance requirement items database 416.

The event type database 432 is configured for receiving, storing, retrieving and updating a plurality of event type item choices like learning visits, industrial visits, short term exchange programs, workshops, tutorials, courses and other short term microlearning events which involve the performance of a plurality of learning applications from learning application database 204, optionally, with other learning users from learning user database 202 or tutoring users from compatible tutors database 410.

The microlearning event management interface generator 434 generates a plurality of interface items for the management of the organization and performance of microlearning events involving a plurality of learning applications on the modular learning system 144. In some embodiments, the event management interface generator 434 accesses a plurality of items generated in modules 406, 408, or 418, or stored in databases 410, 430 or other databases in the microlearning event management module 242, and displays the corresponding interface items through the microlearning event management interface on the microlearning event organizing user 116's user device 140.

The application services database 436 is configured for receiving, storing and updating a plurality of applications. Each application service associated with an available time and a learning application database. Also, each learning application may be in a sequence associated with a designated time.

Although the microlearning event management module 242 is described as being composed of various modules and databases, fewer or more modules or databases (e.g. Application Services Transaction Processor) may comprise the module with the present invention still falling within the scope of various embodiments.

Figure 5:
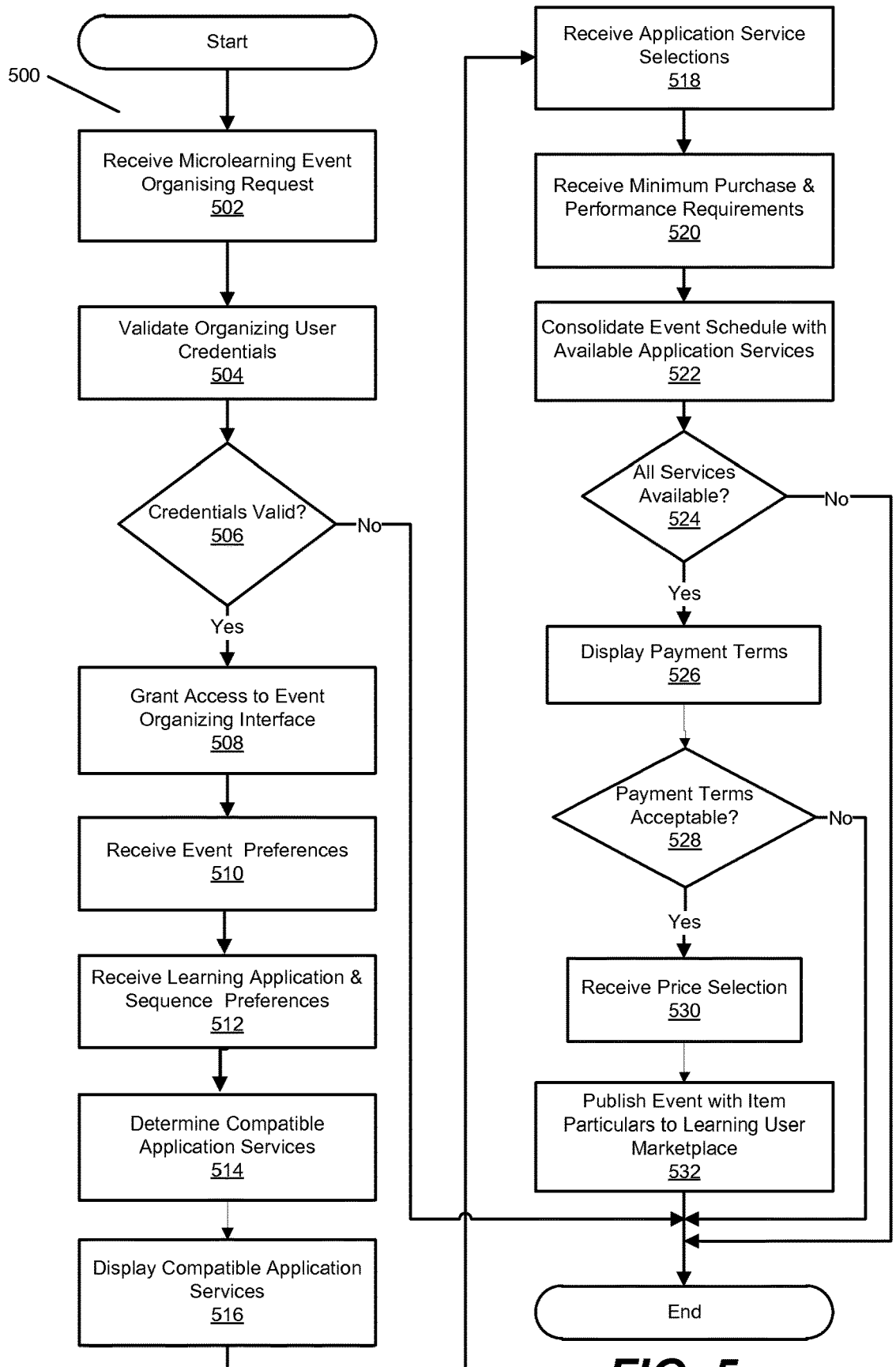
FIG. 5 is a flow diagram of the method for a microlearning event organizing user to organize a microlearning event through a modular learning system according to one embodiment.

FIG. 5 is a flow diagram 500 of a method for managing events in a modular learning system. At step 502, the microlearning event management module 242 receives a microlearning event organizing request from a microlearning event organizing user 116 through an interface generated by microlearning event management interface generator 434 on the microlearning event organizing user 116's device 140. An organizing request may comprise an event type preference selected from a group consisting of learning visits, industrial visits, short-term exchange programs, workshops, tutorials, and courses. Further, the organizing request designates minimum performance requirements specifying a minimum number of performances of the microlearning event. Further, the organizing request designates minimum purchase requirements specifying a minimum number of purchases of the microlearning event. When the request is received from a learning user it comprises an agreement to pay the price associated with the microlearning event. At step 504, the event management interface generator 434 requests the microlearning purchase management module 238 to validate the organizing user's login credentials and user role by accessing the login credential preferences of the microlearning event organizing user 116 in the user database 202 and comparing the same with the login credentials filled in by the microlearning event organizing user 116.

At step 506, the authentication module compares the login credentials filled in by microlearning event organizing user 116 and compares the same with the credential preferences and user role of the microlearning event organizing user 116 by accessing the user database 202. If the credentials and user role are not the same, the event management interface generator 434 does not grant access to the microlearning event management interface to microlearning event organizing user 116. If the credentials and user role are valid, at step 508 the microlearning event management interface generator 434 generates the microlearning event organizing interface as part of the microlearning event management interface with corresponding event organizing items and input areas and displays the same to the microlearning event organizing user 116 on the microlearning event organizing user 116's user device 140.

At step 510, the microlearning event items database 430 receives event type preferences from microlearning event organizing user 116, selected from among a plurality of event type item choices displayed by event management interface generator 434. In various embodiments, the event type item choices are learning visits, industrial visits, short term exchange programs, workshops, tutorials, courses and other short term microlearning events involving the performance of a plurality of learning applications from learning application database 204, optionally, with other learning users from learning user database 202 or tutoring users from compatible tutors database 410.

At step 512, the microlearning event items database 430 receives learning application preferences and sequence preferences from organizing user 116, selected from among a plurality of learning applications in learning application database 204 and choosing, filling in, or ordering the sequence of the same through the learning application sequence management interface displayed as part of the microlearning event management interface generated by event management interface generator 434 and displayed on the microlearning event organizing user 116's user device 140. In some embodiments, the learning applications' sequence may be determined by the organizing user based on the difficulty level of each application of the plurality of learning applications, while in other embodiments, the applications sequence may be determined by learning application sequence manager 418 by accessing the sequence metadata 320 of each learning application 300. In some embodiments, the schedule for each application performance in the microlearning event may be determined by event scheduling module 420 from the event schedule preferences chosen or filled in by microlearning event organizing user 116 from through the event scheduling interface displayed as part of the microlearning event management interface generated by generator 434. The schedule preferences may involve, for example, the date, time and location of each learning application performance on one or more days depending on the event type preferences of the microlearning event.

At step 514, the application services consolidation module 424 accesses the compatible tutors database 410, compatible learning facilities database 412, and learning tools database 422 to determine application services compatible with each of the learning applications chosen by microlearning event organizing user 116. At step 516, the interface generator 434 displays compatible micro tutoring services, learning facility access, and learning tools access for each of the learning applications to organizing user 116 through an event organizing interface displayed on user 116's device 140. At step 518, the consolidation module 424 receives application service preferences for each learning application to be performed in the microlearning event from organizing user 116 through the microlearning event management interface generated by event learning management interface generator 434.

At step 520, the microlearning event items database 430 receives minimum purchase and performance requirements for the microlearning event from microlearning event organizing user 116. The purchase and performance requirements may be selected by the user 116 from a plurality of minimum purchase requirement item choices and minimum performance requirement item choices accessed from purchase requirements database 414 and performance requirements database 416. At step 522, the application services consolidation module 424 may consolidate the microlearning event schedule with the service availability of each of the plurality of application services required to be available at the scheduled date, time and location for each learning application by accessing the service availability items of the compatible application services from compatible tutors database 410, compatible learning facilities database 412 and compatible learning tools database 422 as well as schedule preferences for each learning application in the microlearning event from event scheduling module 420.

At step 524, the consolidation module 424 determines if all preferred application services for each scheduled learning application are available at the scheduled date, time and location. In some embodiments, an optional service availability confirmation request may be generated by the consolidation module 424 and displayed to each of the preferred learning application service providers like tutoring user 112, learning tools supplying user 118 or learning facility administering user 124. If all preferred application services are not available or confirmed to be available, the consolidation module 424 may request event management interface generator 434 to generate and display a reschedule request or a 'change learning application service provider request' to the organizing user 116, and may not proceed until all preferred learning application services are available. In one embodiment, the consolidation module 424 determines a time at which the preferred application services will be available, and recommends that time to the organizing user 116.

At step 526, if all learning application services are available for each learning application in the microlearning event, the interface generator 434 may access each microlearning application service provider's payment terms from the application services payment terms module 426 and display the same to the organizing user 116 (e.g. a tutoring user at five hundred rupees per hour per learning user or five hundred rupees per learning application per learning user, a learning facility at five hundred rupees per hour per learning user or Rs. 500 per learning application per learning user, learning tool access at hundred rupees per hour per learning user or hundred rupees per learning application per learning user). In some embodiments, the interface may further display the terms of payment before and after the delivery of the microlearning application service (e.g. twenty percent booking advance, eighty percent after service delivery for a tutoring user 112). In some embodiments, the payment terms may also include the price of each learning application to be performed at the microlearning event from the price preferences of each such learning application specified by each learning application authoring user 104. In some embodiments, the payment terms may include a plurality of bulk rates depending on the number of learning users performing the learning applications and receiving the learning application services with the bulk price preferences being different from the prices of the same learning application and application services if purchased from the microlearning marketplace on the modular learning system 144.

At step 528, if the terms are not acceptable to organizing user 116, the database 402 may not proceed to receive the microlearning event's price preference from the organizing user 116. At step 530, if the payment terms are acceptable to the microlearning event organizing user 116, the pricing module 428 receives price preferences for the microlearning event from organizing user 116 and stores the same for future access by the microlearning event purchase items database 402. The price preferences (and/or price selection) may be chosen or filled in by organizing user 116 through the microlearning event price preferences interface. At step 532, the microlearning purchase management module 238 accesses the microlearning event purchase items database 402 and publishes the unique microlearning event purchase item of the microlearning event to the microlearning marketplace on the modular learning system 144.

Although the method for managing an event in a modular learning environment is described as being composed of various steps, fewer or more steps (e.g. Display Service Availability Confirmation Request to learning application Service Providers, Process Advance Payment Transactions Between Organizing User and Learning Application Service Providers) may comprise the method with the present invention still falling within the scope of various embodiments.

Figure 6:
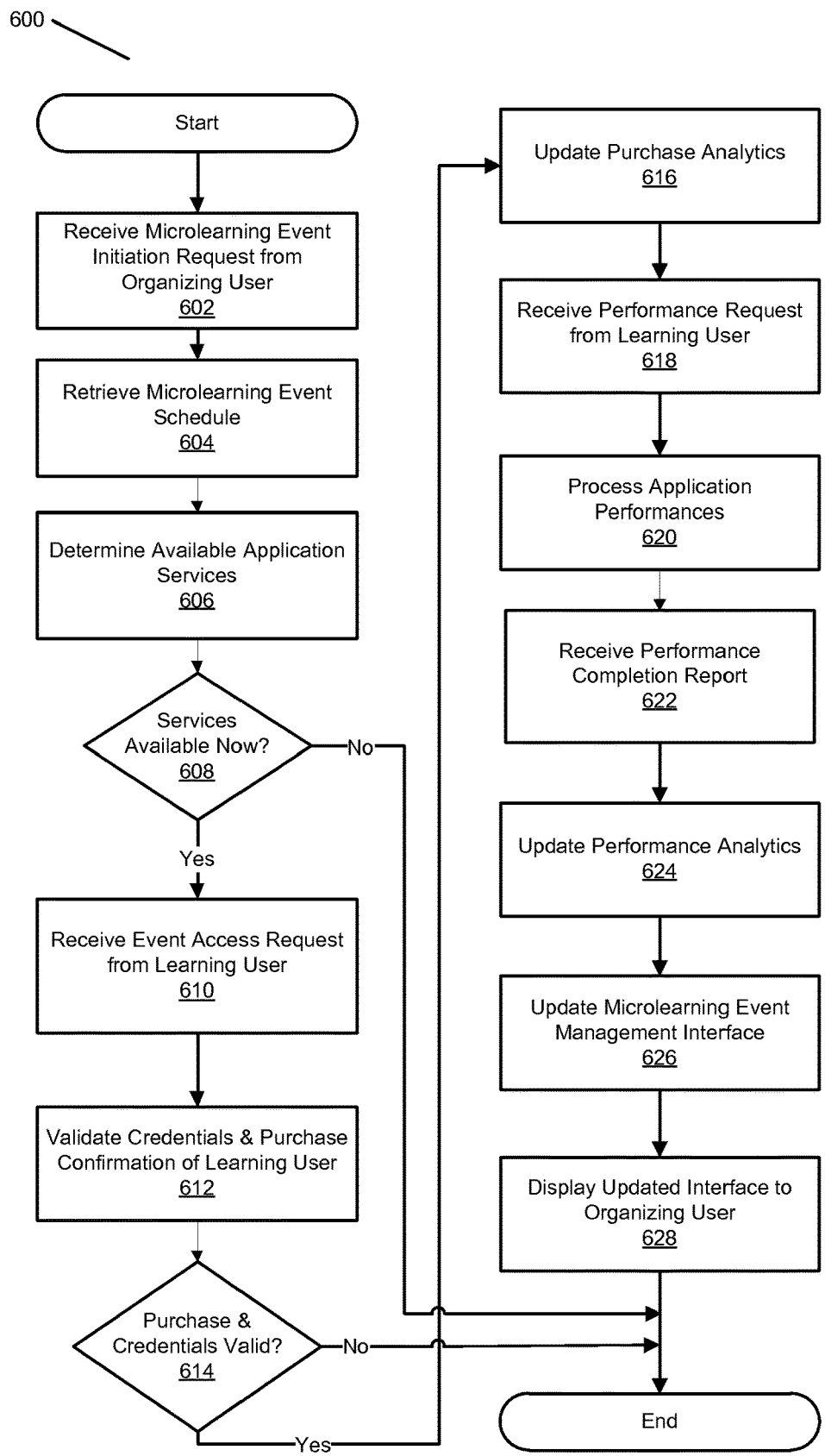
FIG. 6 is a flow diagram of the method for a microlearning event organizing user to manage the performance of a microlearning event in a modular learning system environment according to one embodiment.

FIG. 6 is a flow diagram 600 of the method for managing a microlearning event in a modular learning environment. At step 602, the microlearning event management module 242 receives a microlearning event initiation request from a microlearning event organizing user 116 through the microlearning event management interface generated by event management interface generator 434 and displayed on the user 116's device 140. At step 604, the interface generator 434 retrieves the event schedule item of the microlearning event from microlearning event items database 430 and accesses the schedule of each learning application and accompanying application services for the microlearning event.

At step 606, the interface generator 434 requests the minimum performance requirement items database 416 to determine the immediate application services availability for the microlearning event initiation request. At step 608, the immediate application service availability of the first learning application, first few learning applications or all learning applications are determined by accessing the login and check-in items of the same in microlearning performance management module 240. If all application services for one or more learning applications in the microlearning event are not available immediately, the interface generator 434 may not proceed to receive microlearning event access request from learning users.

At step 610, if the necessary, plurality of requested application services for the microlearning event are immediately available, the microlearning performance management module 240 proceeds to receive microlearning event access requests from one or more learning users through the microlearning event access interface generated by interface generator 434 and displayed on a user device 140. At step 612, the generator 434 may request the authentication module and the microlearning purchase management module 238 to respectively validate and confirm the login credentials and microlearning event purchase item of the learning user 102.

At step 614, the authentication module may compare the login credentials filled in by the learning user through the microlearning event access interface generated by interface generator 434 with the credentials preferences of the learning user by accessing the same from learning user database 202. If the input credentials are not valid, the learning user is denied access to the microlearning event and corresponding performance interfaces. If the input credentials are valid, the microlearning purchase management module 238 confirms the learning user's purchase of microlearning event access. If the purchase items are unavailable or incompatible with the learning user and microlearning event, the learning user is denied access to the microlearning event and corresponding performance interfaces.

At step 616, if the learning user 102's credentials are valid and the purchase of microlearning event access for the microlearning event is confirmed, the purchase analytics module 406 updates purchase analytics items of the microlearning event for future access and analysis by the organizing user 116. At step 618, the microlearning performance management module 240 receives a performance request for the first learning application in the microlearning event from the learning user, a plurality of learning users or the organizing user 116. If a plurality of learning applications are scheduled to be performed in a sequence, the microlearning performance management module 240 may receive a performance request for the entire microlearning event or for a predetermined subset of learning applications in the microlearning event from any of the learning users. If the learning applications are scheduled to be performed in more than one session (e.g. over twenty eight sessions in fourteen days), the performance management module 240 may receive a performance request for the appropriate subset of learning applications at the appropriate date and time from any of the users.

At step 620, the microlearning performance management module 240 processes the plurality of learning application performances for the predetermined plurality of scheduled learning applications and plurality of predetermined attending learning users, by generating learner interface items, and, optionally, tutor interface items for each learning application through the learning application preview interfaces, learning application performance interface, and learning application review interfaces displayed on authorized user devices 140 to a plurality of predetermined attending learning users and, optionally, predetermined tutoring, monitoring or reviewing service providing tutoring users during the microlearning event. Each of the learning performances or set of performances may occur and be processed in the performance mode specified by the application 300's mode metadata 324. In some embodiments, the performance mode may be determined by the organizing user 116 based on the event type chosen from the plurality of kinds of event types in event type database 432.

At step 622, after the completion of each of the learning application performances, the performance management module 240 receives a performance completion report by an input from the performing learning user, the service providing tutoring user, the duration metadata 310 of the learning application, or the organizing user 116. At step 624, the microlearning performance management module 240 updates the performance analytics module 408 with a plurality of performance analytics items and, optionally, recording, measurement, scoring or review items generated or received during each learning application performance in the microlearning event. In some embodiments, based on the performance privacy preferences of the learning user a step of receiving performance items of each learning user's application performances in the microlearning event is performed and the same is stored without the learning user's corresponding identity items, wherein the performance items are an indicator of number of performances.

At step 626, the interface generator 434 accesses the purchase analytics items and performance analytics items and generates the corresponding updated analytics interface items for the microlearning event. At step 628, the interface generator 434 displays the updated microlearning event management interface to organizing user 116 with interface items including, for example, analytics interface items generated in the previous step, and displays the set of performance measurements to the organizing user 116 on user 116's device 140.

Although the method for managing the performances of microlearning applications in a modular learning environment is described as being composed of various steps, fewer or more steps (e.g. Receive Microlearning Event Completion Confirmation From Organizing User, Display Learning Application Performance Sequence And Microlearning event Schedule To Learning Users) may comprise the method with the present invention still falling within the scope of various embodiments.

Computing Machine Architecture

Figure 7:
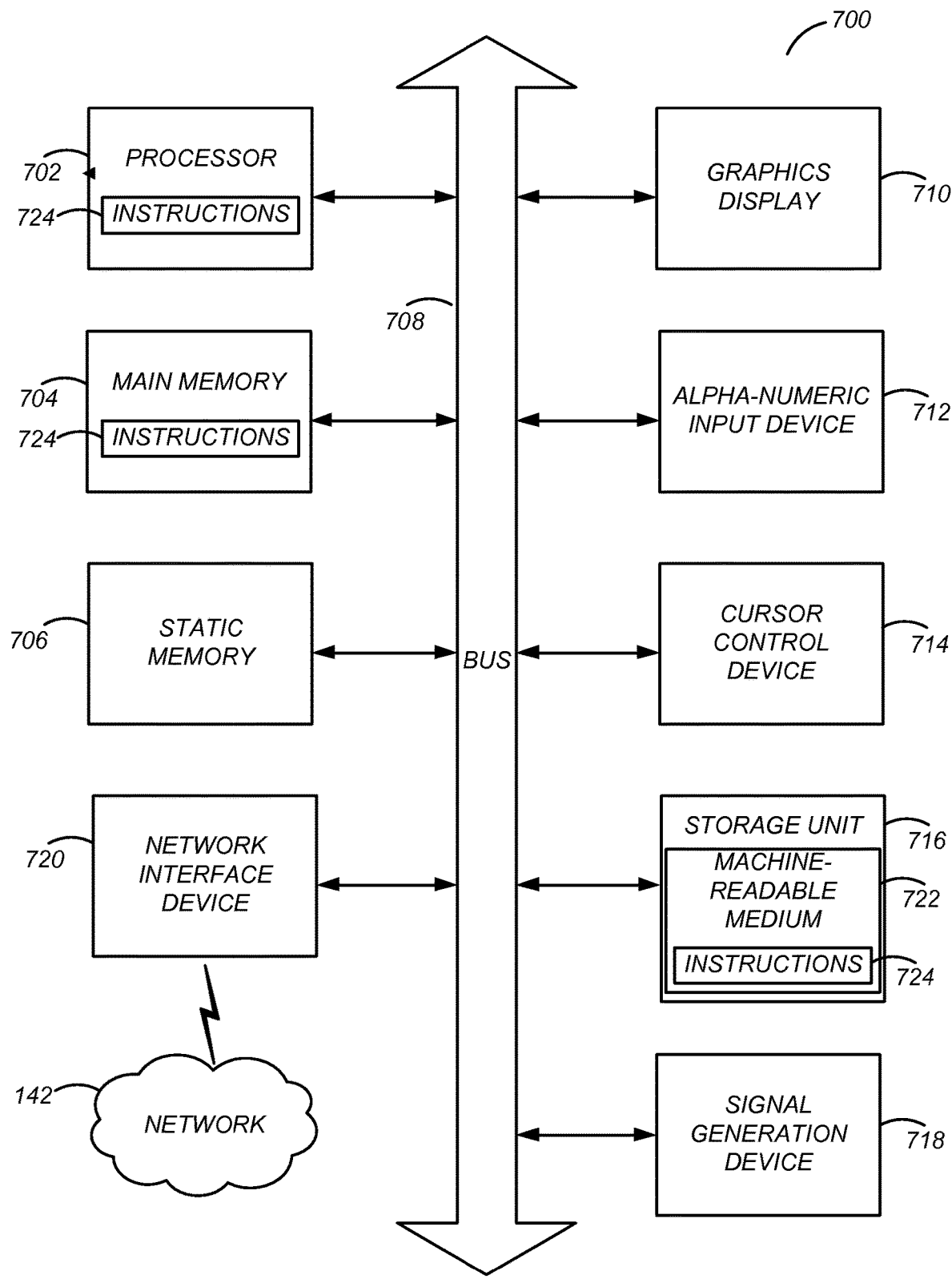
FIG. 7 illustrates components of an example machine able to read instructions from a machine-readable medium and execute them in a processor (or controller) according to one embodiment.

FIG. 7 is a block diagram illustrating components of an example machine suitable for use as a modular learning system 144, in which any of the embodiments disclosed herein may be performed, according to one embodiment. This example machine is able to read instructions from a machine-readable medium and execute them in a processor (or controller).

Specifically, FIG. 7 shows a diagrammatic representation of a machine in the example form of a computer system 700 within which instructions 724 (e.g. software) for causing the machine to perform any one or more of the methodologies discussed herein may be executed. In alternative embodiments, the machine operates as a standalone device or may be connected (e.g. networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g. a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include a graphics display unit 710 (e.g. a plasma display panel (PDP), a liquid crystal display (LCD), a projector, or a cathode ray tube (CRT)). The computer system 700 may also include alphanumeric input device 712 (e.g. a keyboard), a cursor control device 714 (e.g. a mouse, a trackball, a joystick, a motion sensor, or other pointing instrument), a storage unit 716, a signal generation device 718 (e.g. a speaker), and a network interface device 720, which also are configured to communicate via the bus 708.

The storage unit 716 includes a machine readable medium 722 on which is stored instructions 724 (e.g. software) embodying any one or more of the methodologies or functions described herein. The instructions 724 (e.g. software) may also reside, completely or at least partially, within the main memory 704 or within the processor 702 (e.g. within a processor's cache memory) during execution thereof by the computer system 700, the main memory 704 and the processor 702 also constituting machine-readable media. The instructions 724 (e.g. software) may be transmitted or received over a network 142 via the network interface device 720.

While machine readable medium 722 is shown in an example embodiment to be a single medium, the term "machine-readable medium" should be taken to include a single medium or multiple media (e.g. a centralized or distributed database, or associated caches and servers) able to store instructions (e.g. instructions 724). The term "machine-readable medium" shall also be taken to include any medium that is capable of storing instructions (e.g. instructions 724) for execution by the machine and that cause the machine to perform any one or more of the methodologies disclosed herein. The term "machine-readable medium" includes, but not be limited to, data repositories in the form of solid-state memories, optical media, and magnetic media.

The modular learning system 144 may be one or more servers in which one or more methods disclosed herein are performed. The processor 702 may be a microprocessor, a state machine, an application specific integrated circuit, a field programmable gate array, etc. (e.g. Intel® Pentium® processor). The main memory 704 may be a dynamic random access memory and/or a primary memory of the modular learning system 144. The static memory 706 may be a hard drive, a flash drive, and/or other memory information associated with the modular learning system 144.

The bus 708 may be an interconnection between various circuits and/or structures of the modular learning system 144. The video display 710 may provide graphical representation of information on the modular learning system 144. The alphanumeric input device 712 may be a keypad, keyboard and/or any other input device. The cursor control device 714 may be a pointing device such as a mouse.

The storage unit 716 may be a hard drive, a storage system, and/or other longer term storage subsystem. The signal generation device 718 may be a bios and/or a functional operating system of the modular learning system 144. The network interface device 720 may be a device that may perform interface functions such as code conversion, protocol conversion and/or buffering required for communication to and from a network (e.g. the network 142 of FIG. 1). The machine readable medium 722 may provide instructions 724 on which any of the methods disclosed herein may be performed. The instructions 724 may provide source code and/or data code to the processor 702 to enable any one/or more operations disclosed herein. For example, the modular learning system 144 may be stored in the form of instructions 724 on a storage medium such as the main memory 704 and/or the machine readable medium 722 such as compact disk.

In one embodiment, a non-transitory medium, or a non-transitory computer readable storage medium storing computer program instructions executable by a processor or a computing device (e.g., the modular learning system 144) causes the computing device to perform method steps illustrated in FIG. 5 and FIG. 6.

Additional Configuration Considerations

In one embodiment, if the necessary application services for an event are not immediately available when a user requests access to the event, microlearning event management module 242 may determine equivalent application services that are available and recommends the available services to the user. For example, if one or more learning tools required for a learning event are not available at a particular facility at the time of the event, the microlearning event management module 242 may determine alternative facilities that have the required learning tools. The event management module 242 may narrow the list of alternative facilities by recommending facilities that are close to the original facility (e.g., less than five kilometers away), are highly rated by users, have a cost that is less than or equal to the cost of the original facility, and other characteristics of the alternate facility that may make the alternate attractive to the user.

For example, an organizing user may request to initiate a swimming microlearning event at facility A that requires a pool, two pairs of swim goggles, and two tutors. The microlearning event management module 242 determines the availability of the required services at facility A. If the pool is not available at the time of the event, the event management module 242 determines alternative facilities that are in close proximity to facility A and that have a pool, swim goggles, and two tutors available to teach the swimming event. In addition, among the possible alternative facilities, the event management module 242 may recommend the facility with availability at the desired time, the facility closest to the learning user or originally requested facility, the highest ranked tutors available to teach at that facility, or a combination of these and other factors.

Throughout this specification, plural instances may implement modules, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate modules in example configurations may be implemented as a combined structure or module. Similarly, structures and functionality presented as a single module may be implemented as separate modules. These and other variations, modifications, additions, and improvements fall within the scope of the subject matter herein.

Certain embodiments are described herein as including functionality implemented in computing logic or a number of modules, components, or mechanisms, for example, as illustrated in FIGS. 2 and 4. Modules may constitute either software modules (e.g. code embodied on a machine-readable medium or in a transmission signal) or hardware modules. A hardware module is tangible unit capable of performing certain operations and may be configured or arranged in a certain manner. In example embodiments, one or more computer systems (e.g. a standalone, client or server computer system) or one or more hardware modules of a computer system or a computer-implemented method (e.g. a processor or a group of processors) may be configured by software (e.g. an application or application portion) as a hardware module that operates to perform certain operations as described herein.

In various embodiments, a hardware module may be implemented mechanically or electronically. For example, a hardware module may comprise dedicated circuitry or logic that is permanently configured (e.g. as a special-purpose processor, such as a field programmable gate array (FPGA) or an application-specific integrated circuit (ASIC)) to perform certain operations. A hardware module may also comprise programmable logic or circuitry (e.g. as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g. configured by software) may be driven by cost and time considerations.

The various operations of example methods described herein may be performed, at least partially, by one or more processors, e.g. processor 702, that are temporarily configured (e.g. by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g. the Internet) and via one or more appropriate interfaces (e.g. application program interfaces (APIs).)

In another embodiment, the microlearning purchase and performance interface provided by the modular learning system 144 can be accessed over a local area network, intranet or virtual private network accessible to a limited plurality of user devices at a preschool, school, college, university, educational board, professional standards authority, coaching class, a company, HR department, training department or at a training organization through a user device.

In another embodiment, the microlearning purchase and performance interface provided by the modular learning system 144 can be accessed over a wide area network, General Packet Radio Service network, an Enhanced Data for Global Evolution network, a 3G telecommunications network, a 4G LTE telecommunications network or other telecommunications network through a user device.

The performance of certain of the operations may be distributed among the one or more processors, not only residing within a single machine, but deployed across a number of machines. In some example embodiments, the one or more processors or processor-implemented modules may be located in a single geographic location (e.g. within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g. a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Although the present embodiments have been described with reference to specific example embodiments, it will be evident that various modifications and changes may be made to these embodiments without departing from the broader spirit and scope of the various embodiments. For example, the various devices, modules, databases, etc. described herein may be enabled and operated using hardware circuitry (e.g. complementary metal-oxide-semiconductor (CMOS) based logic circuitry), firmware, software and/or any combination of hardware, firmware, and/or software (e.g. embodied in a machine readable medium).

Unless specifically stated otherwise, discussions herein using words such as "processing," "computing," "calculating," "determining," "presenting," "displaying," or the like may refer to actions or processes of a machine (e.g. a computer) that manipulates or transforms data represented as physical (e.g. electronic, magnetic, or optical) quantities within one or more memories (e.g. volatile memory, nonvolatile memory, or a combination thereof), registers, or other machine modules that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and modules of the embodiments herein. This is done merely for convenience and to give a general sense of the invention. This description should be read to include one or at least one and the singular also includes the plural unless it is obvious that it is meant otherwise.

According to the embodiments described in FIG. 1 through 6, various methods and electric structures may be embodied using transistors, logic gates, and electrical circuits (e.g. Application Specific Integrated Circuitry and/or in Digital Signal Processor circuitry). For example, the purchase management module 238, performance management module 240 and other modules of FIGS. 1 to 6 may be enabled using a purchase management circuit, a performance management circuit, and other circuits using one or more of the technologies described herein. In addition, it will be appreciated that the various operations, processes, and methods disclosed herein may be embodied in a machine-readable medium and/or a machine accessible medium compatible with a data processing system (e.g. a server) and may be performed in any order. Accordingly, the specification and drawings are to be regarded in an illustrative rather than a restrictive sense.

Upon reading this disclosure, those of skill in the art will appreciate still additional alternative structural and functional designs for a system and a process for managing the purchase and performance of learning applications and associated application services in a microlearning stack through the disclosed principles herein. Thus, while particular embodiments and applications have been illustrated and described, it is to be understood that the disclosed embodiments are not limited to the precise construction and modules disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A computer-implemented method for generating access-limited microlearning event listings of microlearning events based on dynamically updated content module metadata, for learning users in a learning system, the learning system including one or more processors and a plurality of user computing devices, the plurality of user computing devices being remotely linked over a computer network through a network interface device configured to perform functions enabling communication to and from the computer network via a mobile application or a browser-based web application, a computer desktop application, an electronic module or subsystem of a social networking environment, an electronic learning content management system, a professional networking environment, an electronic commerce system, an electronic payments system, or an Internet-based website, each of the plurality of user computing devices including an electronic user interface and an electronic display, the one or more processors configured with one or more computer-implemented modules or generators comprising a microlearning event management module, a service sale compatibility module, a purchase analytics module, a performance analytics module, a learning application content module sequence manager, a microlearning event listing module, a microlearning application service listing consolidation module, a microlearning event listing interface generator, a microlearning service listing interface generator, at least one of the one or more modules or generators including at least one learning content module-based microlearning event database with listing data arranged in data fields, the method comprising the steps of:

generating, on an electronic user device associated with an organizing user, an electronic microlearning event listing interface generated by an electronic microlearning event listing interface generator, wherein the microlearning event listing interface comprises at least one learning content module or learning content module group associated with a microlearning event listing, and at least one microlearning service listing associated with each learning content module or learning content module group within the microlearning event listing, wherein viewing access to microlearning service listings from the microlearning event listing interface is limited to a subset of the plurality of compatible or predetermined organizing users, and wherein viewing access to the microlearning event listing from a microlearning service listing interface is limited to a subset of the plurality of compatible or predetermined microlearning service providing users;

receiving, from an electronic microlearning event listing interface generated by an electronic microlearning event listing interface generator, on an electronic user device associated with the organizing user, a microlearning event listing request comprising a plurality of user-defined learning content modules or learning content module groups associated with the microlearning event listing request; generating, from a sale compatibility module, or from an electronic microlearning event listing interface generated by the electronic microlearning event listing interface generator, on an electronic user device associated with the organizing user, a predetermined or user-defined range of prices of compatible microlearning services for each microlearning service listing associated with each learning content module or learning content module group within the microlearning event listing;

determining, from a service compatibility module, at least one of a plurality of compatible microlearning service providing users previously associated with each learning content module or learning content module group within the microlearning event listing based on at least one of a plurality of dynamically updated metadata of each learning content module or learning content module group, wherein such metadata includes at least one of certification metadata, scoring metrics metadata, language metadata, performance type metadata, duration metadata, subject metadata, age level metadata, learning facility metadata, authoring metadata, sequence metadata, tool metadata, mode metadata, medium metadata, job skill metadata, error metadata, template metadata, or tutor metadata;

generating, from the microlearning service listing consolidation module, for display on at least one electronic microlearning event listing interface generated by the electronic microlearning event listing interface generator, on an electronic user device associated with the organizing user, a microlearning service listing confirmation from the subset of compatible microlearning service providing users including at least one tangible learning facility access administering user, at least one tutoring user, or at least one tangible learning tool supplying user, each such microlearning service listing confirmation associated with a learning content module or learning content module group included in the microlearning event listing request;

denying access to the plurality of microlearning service listing confirmation from at least one of a plurality of compatible microlearning service providing users including at least one tangible learning facility access administering user, at least one tutoring user, or at least one tangible learning tool supplying user, which do not meet a minimum purchase requirement or a minimum performance requirement for each microlearning event listing predetermined by the organizing user; and displaying, from the electronic microlearning event listing interface generator, on an electronic user device associated with a learning user, a microlearning event listing of a content-module based learning event to at least one of a plurality of compatible learning users, each microlearning event listing comprising:

at least one learning content module or learning content module group, each module or content module group associated with at least one confirmed microlearning service listing including a tangible learning facility access service listing, a tangible tutoring session service listing or a tangible tool access service listing.

2. The computer-implemented method of claim 1, wherein the step of generating an electronic microlearning event listing interface further comprises:
a provision for assigning viewing rights of the microlearning event listing to a plurality of compatible or predetermined learning users.

3. The computer-implemented method of claim 1, wherein the step of generating an electronic microlearning event listing interface further comprises:
a provision for assigning microlearning service listing rights within the microlearning event listing to a plurality of compatible or predetermined microlearning service providing users based on a microlearning service listing invitation request and microlearning service listing confirmation interface.

4. The computer-implemented method of claim 1, wherein the step of generating an electronic microlearning event listing interface further comprises:
a provision for retaining ownership rights of the microlearning event listing to the organizing user.

5. The computer-implemented method of claim 1, wherein the step of generating a predetermined or user-defined range of prices of compatible microlearning services for each microlearning service listing associated with each learning content module or learning content module group within the microlearning event listing further includes a not specified default range option for each microlearning service listing.

6. The computer-implemented method of claim 1, wherein the step of determining compatible microlearning service providing users within the microlearning event listing is followed by:
receiving from the microlearning service listing consolidation module via a microlearning service listing interface on the electronic user device associated with the organizing user, a microlearning service listing invitation request for each microlearning service associated with each learning content module or learning content module group within the microlearning event listing, to all or a subset of the plurality of compatible microlearning service providing users previously associated with each learning content module or learning content module group within the microlearning event listing and approved by the organizing user.

7. The computer-implemented method of claim 1, wherein the step of determining compatible microlearning service providing users within the microlearning event listing further comprises:
generating from the microlearning event listing module, one or a plurality of microlearning service listing invitation requests for display on an electronic microlearning service listing interface generated by the microlearning service listing interface generator, on an electronic user device associated with one or a plurality of compatible microlearning service providing users including at least one tangible learning facility access administering user, at least one tutoring user or at least one tangible learning tool supplying user, each microlearning service listing invitation request associated with a learning content module or a learning content module group and a microlearning event schedule parameter associated with the learning content module or learning content module group.

8. The computer-implemented method of claim 1, wherein the step of generating a microlearning service listing confirmation further comprises:
receiving, from an electronic microlearning event listing interface generated by the electronic microlearning event listing interface generator on the electronic user device associated with the organizing user, the microlearning service listing preference from the organizing user for each learning content module or learning content module group, each microlearning service listing preference including each microlearning service listing associated with each one of the plurality of microlearning service listing confirmations received for each microlearning service from the plurality of compatible service providing users.

9. An apparatus for generating access-limited microlearning event listings of microlearning events based on dynamically updated content module metadata, for learning users in a learning system, the apparatus comprising:
a learning system including one or more processors and a plurality of user computing devices, the plurality of user computing devices being remotely linked over a computer network through a network interface device configured to perform functions enabling communication to and from the computer network via a mobile application or a browser-based web application, a computer desktop application, an electronic module or subsystem of a social networking environment, an electronic learning content management system, a professional networking environment, an electronic commerce system, an electronic payments system, or an Internet-based website, each of the plurality of user computing devices including an electronic user interface and an electronic display, the one or more processors configured with one or more computer-implemented modules or generators comprising a microlearning event management module, a service sale compatibility module, a purchase analytics module, a performance analytics module, a learning application content module sequence manager, a microlearning event listing module, a microlearning application service listing consolidation module, a microlearning event listing interface generator, a microlearning service listing interface generator, at least one of the one or more modules or generators including at least one learning content module-based microlearning event database with listing data arranged in data fields;
a non-volatile memory including:
instructions for execution on at least one of the one or more processors, the instructions executable to perform steps comprising:
generating, on an electronic user device associated with an organizing user, an electronic microlearning event listing interface generated by an electronic microlearning event listing interface generator, wherein the microlearning event listing interface comprises at least one learning content module or learning content module group associated with a microlearning event listing, and at least one microlearning service listing associated with each learning content module or learning content module group within the microlearning event listing, wherein viewing access to microlearning service listings from the microlearning event listing interface is limited to a subset of the plurality of compatible or predetermined organizing users, and wherein viewing access to the microlearning event listing from a microlearning service listing interface is limited to a subset of the plurality of compatible or predetermined microlearning service providing users;
receiving, from an electronic microlearning event listing interface generated by an electronic microlearning event listing interface generator, on an electronic user device associated with the organizing user, a microlearning event listing request comprising a plurality of user-defined learning content modules or learning content module groups associated with the microlearning event listing request; generating, from a sale compatibility module, or from an electronic microlearning event listing interface generated by the electronic microlearning event listing interface generator, on an electronic user device associated with the organizing user, a predetermined or user-defined range of prices of compatible microlearning services for each microlearning service listing associated with each learning content module or learning content module group within the microlearning event listing;
determining, from a service compatibility module, at least one of a plurality of compatible microlearning service providing users previously associated with each learning content module or learning content module group within the microlearning event listing based on at least one of a plurality of dynamically updated metadata of each learning content module or learning content module group, wherein such metadata includes at least one of certification metadata, scoring metrics metadata, language metadata, performance type metadata, duration metadata, subject metadata, age level metadata, learning facility metadata, authoring metadata, sequence metadata, tool metadata, mode metadata, medium metadata, job skill metadata, error metadata, template metadata, or tutor metadata;
generating, from the microlearning service listing consolidation module, for display on at least one electronic microlearning event listing interface generated by the electronic microlearning event listing interface generator, on an electronic user device associated with the organizing user, a microlearning service listing confirmation from the subset of compatible microlearning service providing users including at least one tangible learning facility access administering user, at least one tutoring user, or at least one tangible learning tool supplying user, each such microlearning service listing confirmation associated with a learning content module or learning content module group included in the microlearning event listing request;
denying access to the plurality of microlearning service listing confirmation from at least one of a plurality of compatible microlearning service providing users including at least one tangible learning facility access administering user, at least one tutoring user, or at least one tangible learning tool supplying user, which do not meet a minimum purchase requirement or a minimum performance requirement for each microlearning event listing predetermined by the organizing user; and
displaying, from the electronic microlearning event listing interface generator, on an electronic user device associated with a learning user, a microlearning event listing of a content-module based learning event to at least one of a plurality of compatible learning users, each microlearning event listing comprising:

at least one learning content module or learning content module group, each module or content module group associated with at least one confirmed microlearning service listing including a tangible learning facility access service listing, a tangible tutoring session service listing or a tangible tool access service listing.

10. The apparatus of claim 9, wherein the step of generating an electronic microlearning event listing interface further comprises:

a provision for assigning viewing rights of the microlearning event listing to a plurality of compatible or predetermined learning users.

11. The apparatus of claim 9, wherein the step of generating an electronic microlearning event listing interface further comprises:

a provision for assigning microlearning service listing rights within the microlearning event listing to a plurality of compatible or predetermined microlearning service providing users based on a microlearning service listing invitation request and microlearning service listing confirmation interface.

12. The apparatus of claim 9, wherein the step of generating an electronic microlearning event listing interface further comprises:

a provision for retaining ownership rights of the microlearning event listing to the organizing user.

13. The apparatus of claim 9, wherein the step of generating a predetermined or user-defined range of prices of compatible microlearning services for each microlearning service listing associated with each learning content module or learning content module group within the microlearning event listing further includes a not specified default range option for each microlearning service listing.

14. The apparatus of claim 9, wherein the step of determining compatible microlearning service providing users within the microlearning event listing is followed by:

receiving from the microlearning service listing consolidation module via a microlearning service listing interface on the electronic user device associated with the organizing user, a microlearning service listing invitation request for each microlearning service associated with each learning content module or learning content module group within the microlearning event listing, to all or a subset of the plurality of compatible microlearning service providing users previously associated with each learning content module or learning content module group within the microlearning event listing and approved by the organizing user.

15. The apparatus of claim 9, wherein the step of determining compatible microlearning service providing users within the microlearning event listing further comprises:

generating from the microlearning event listing module, one or a plurality of microlearning service listing invitation requests for display on an electronic microlearning service listing interface generated by the microlearning service listing interface generator, on an electronic user device associated with one or a plurality of compatible microlearning service providing users including at least one tangible learning facility access administering user, at least one tutoring user or at least one tangible learning tool supplying user, each microlearning service listing invitation request associated with a learning content module or a learning content module group and a microlearning event schedule parameter associated with the learning content module or learning content module group.

16. The apparatus of claim 9, wherein the step of generating a microlearning service listing confirmation further comprises:

receiving, from an electronic microlearning event listing interface generated by the electronic microlearning event listing interface generator on the electronic user device associated with the organizing user, the microlearning service listing preference from the organizing user for each learning content module or learning content module group, each microlearning service listing preference including each microlearning service listing associated with each one of the plurality of microlearning service listing confirmations received for each microlearning service from the plurality of compatible service providing users.

\* \* \* \* \*